Oct. 28, 1941.          O. J. POUPITCH          2,261,093
             SURFACE TESTING AND RECORDING MACHINE
                Filed Jan. 15, 1940          9 Sheets-Sheet 5
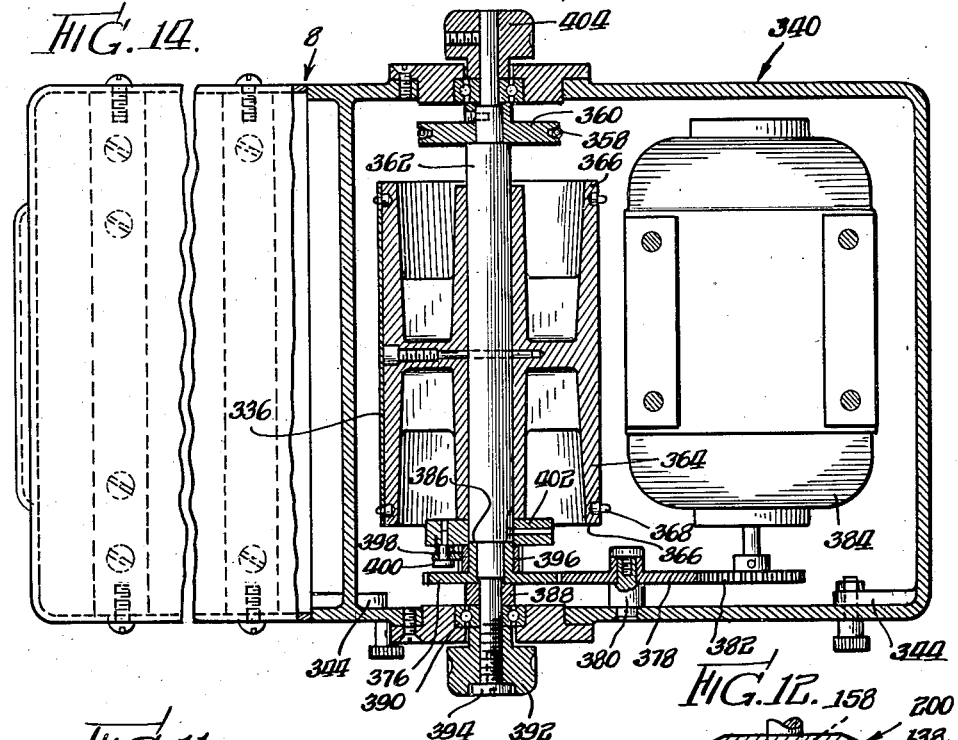
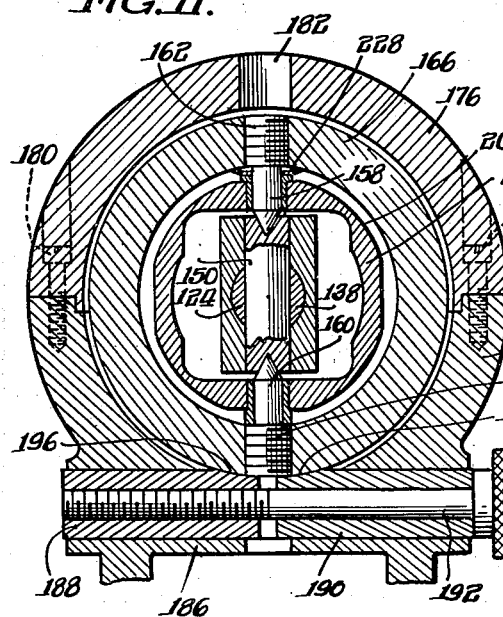
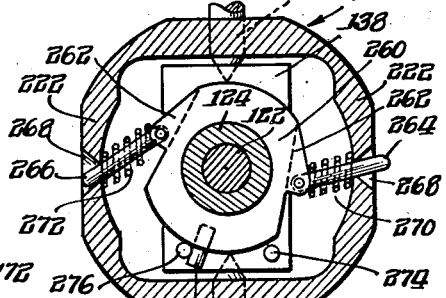
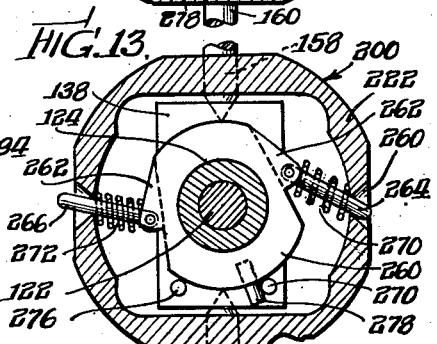
INVENTOR.
Ougljesa Jules Poupitch
BY Cox & Moore ATTORNEYS.

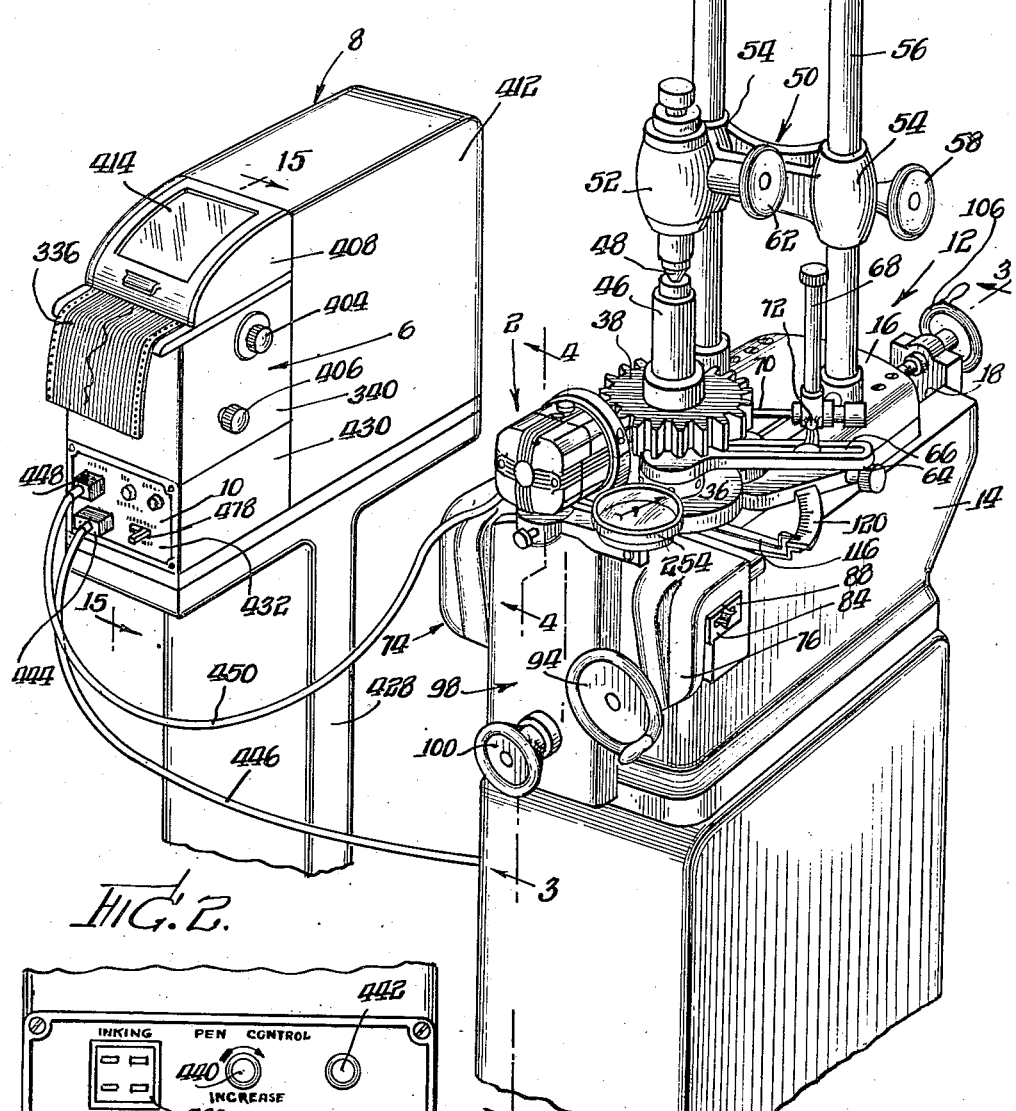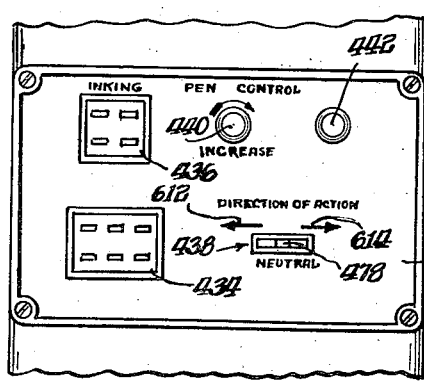

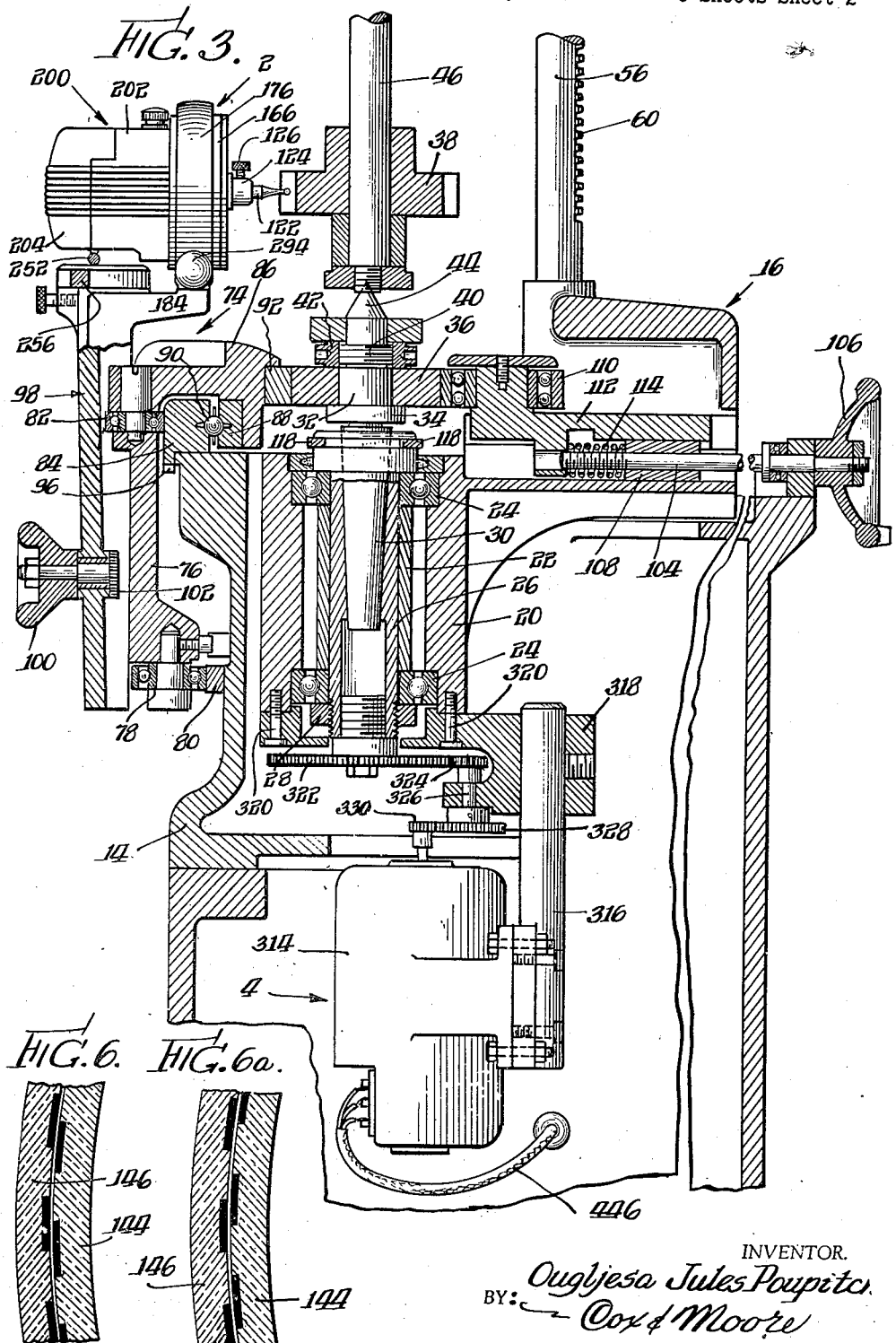

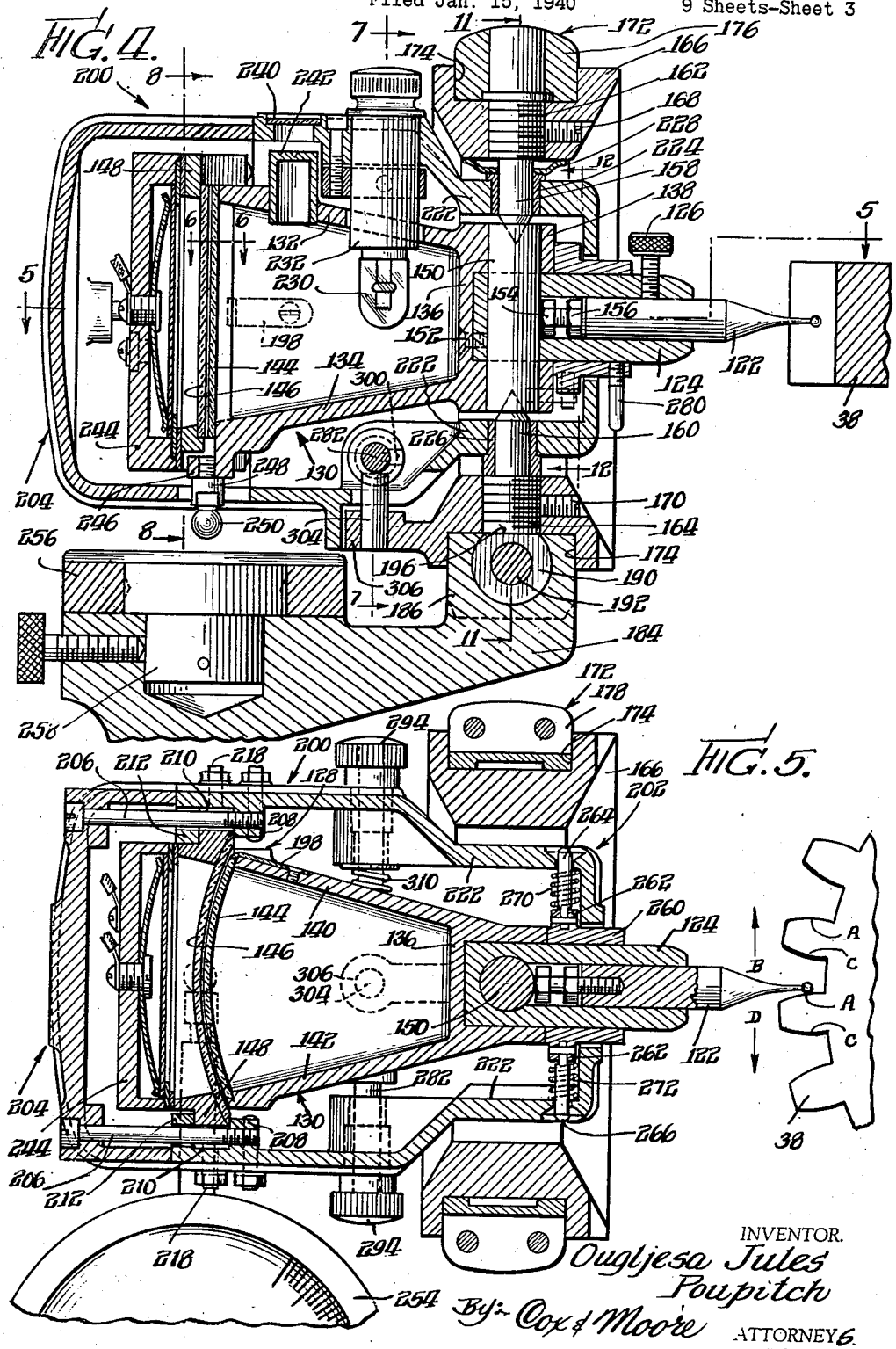

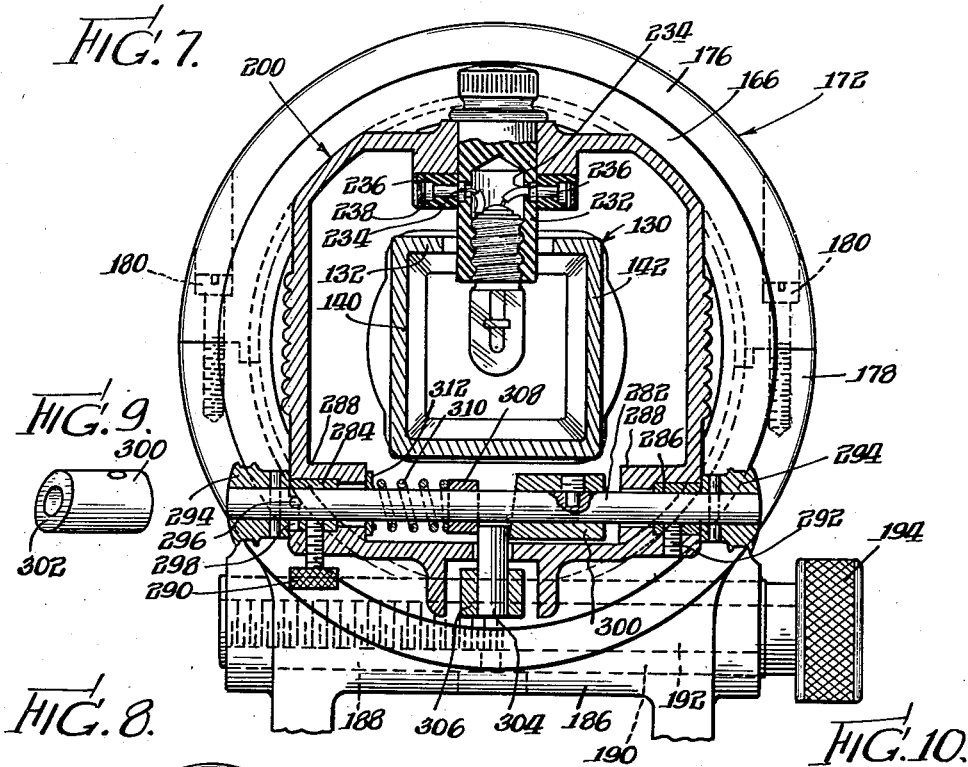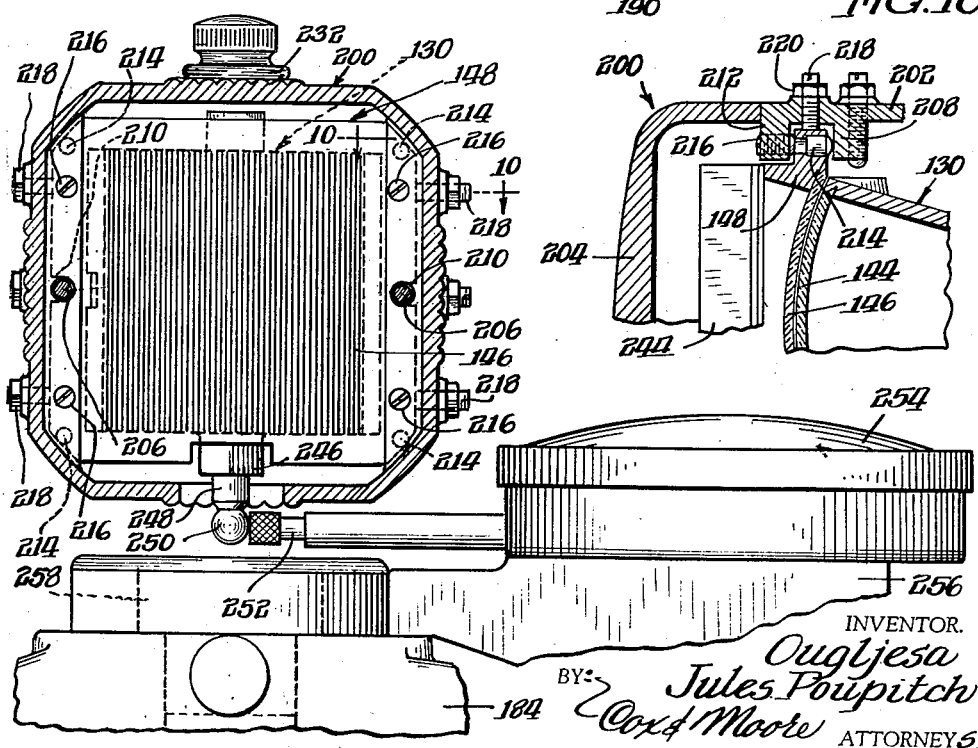

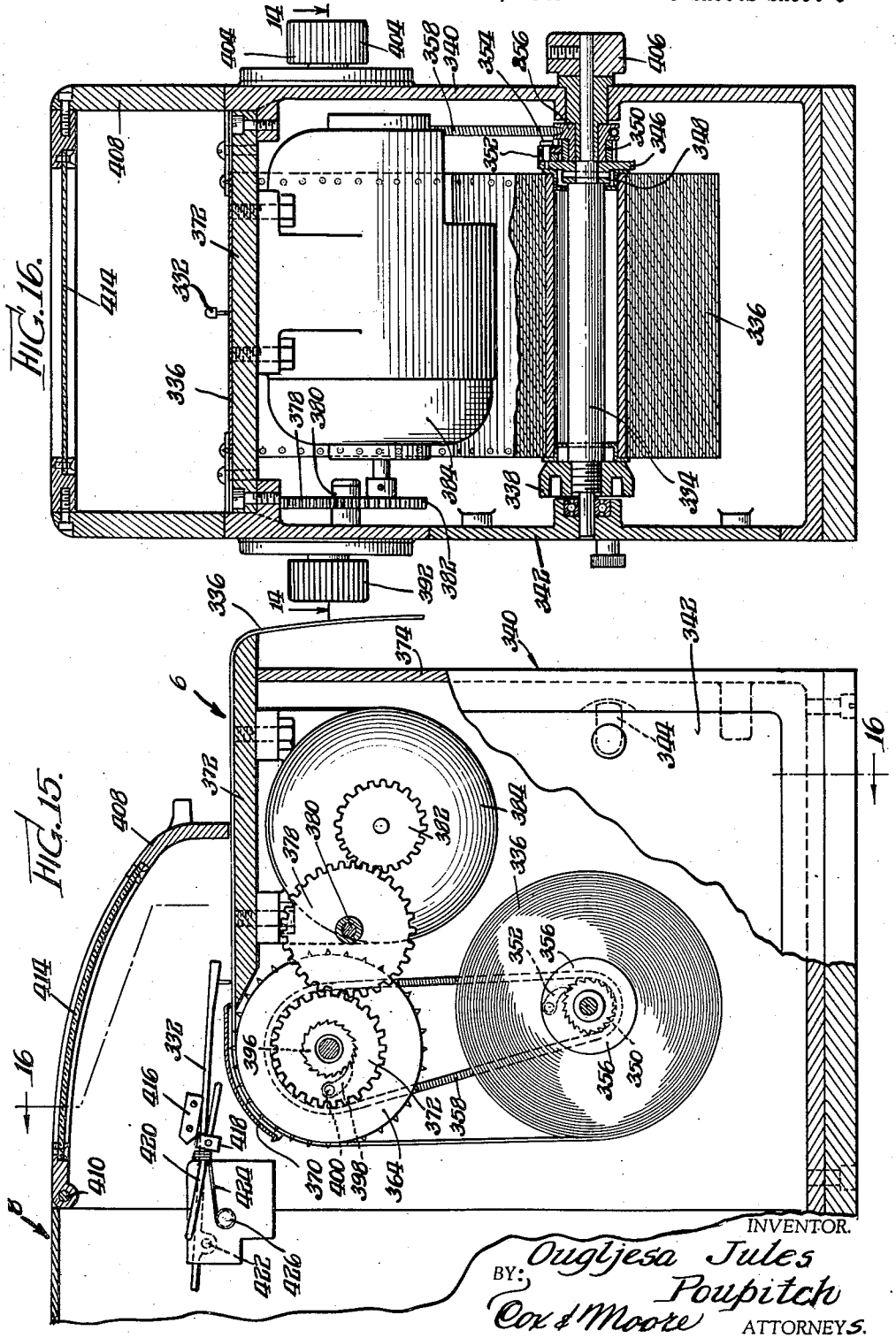

Oct. 28, 1941.   O. J. POUPITCH   2,261,093
SURFACE TESTING AND RECORDING MACHINE
Filed Jan. 15, 1940   9 Sheets-Sheet 7
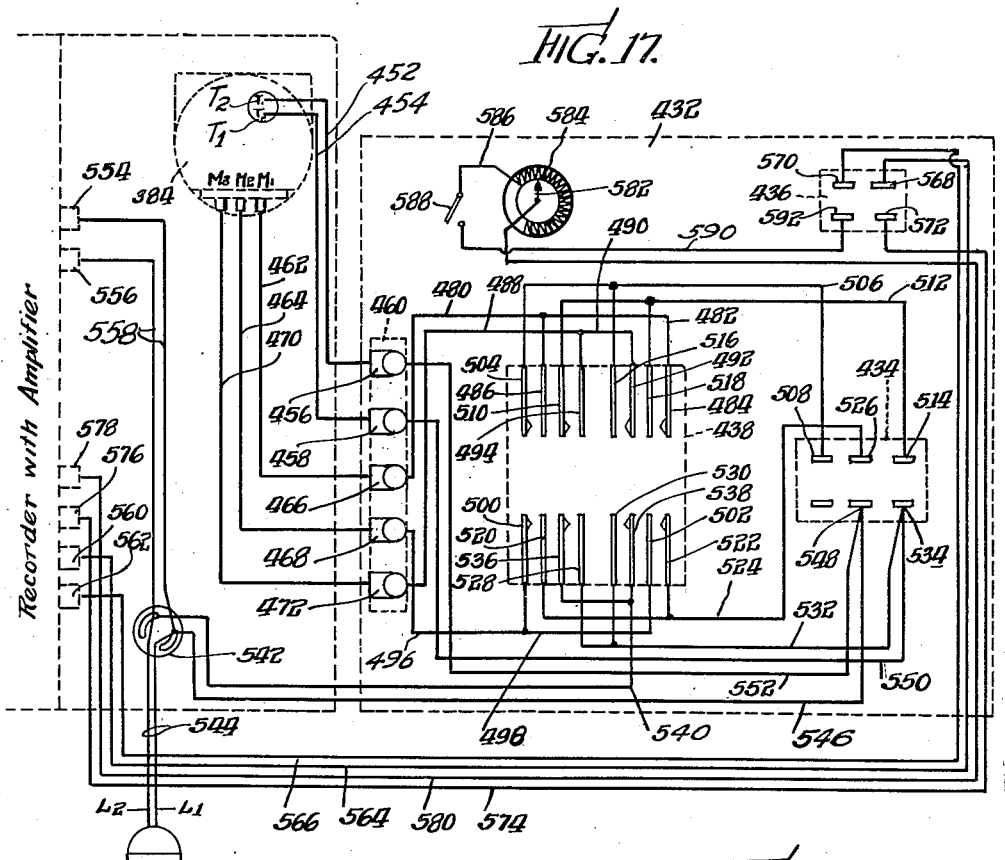
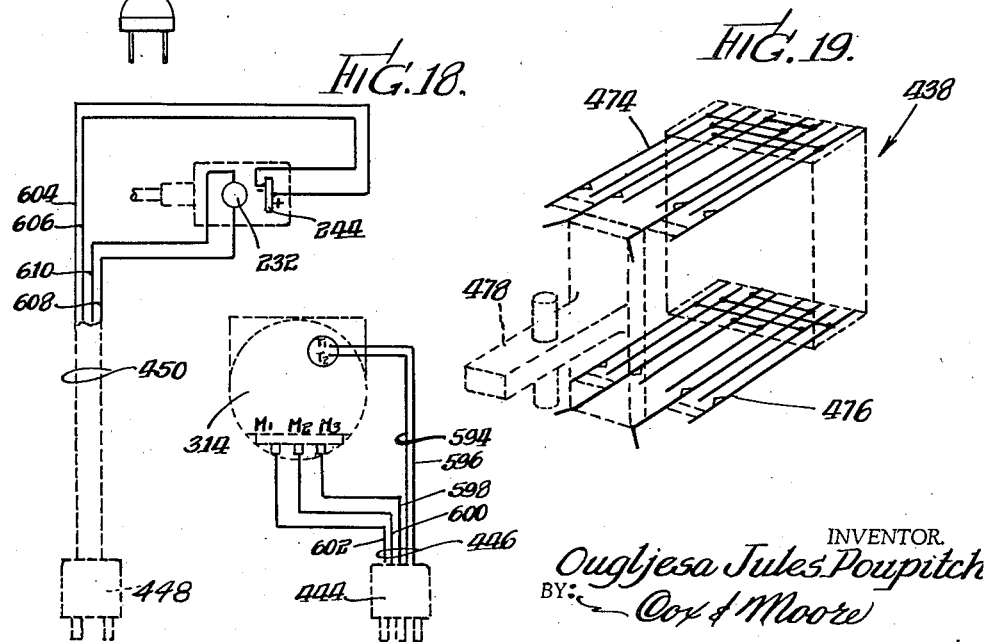
INVENTOR.
Ougljesa Jules Poupitch
BY Cox & Moore
ATTORNEYS.

Oct. 28, 1941.  O. J. POUPITCH  2,261,093
SURFACE TESTING AND RECORDING MACHINE
Filed Jan. 15, 1940  9 Sheets-Sheet 8
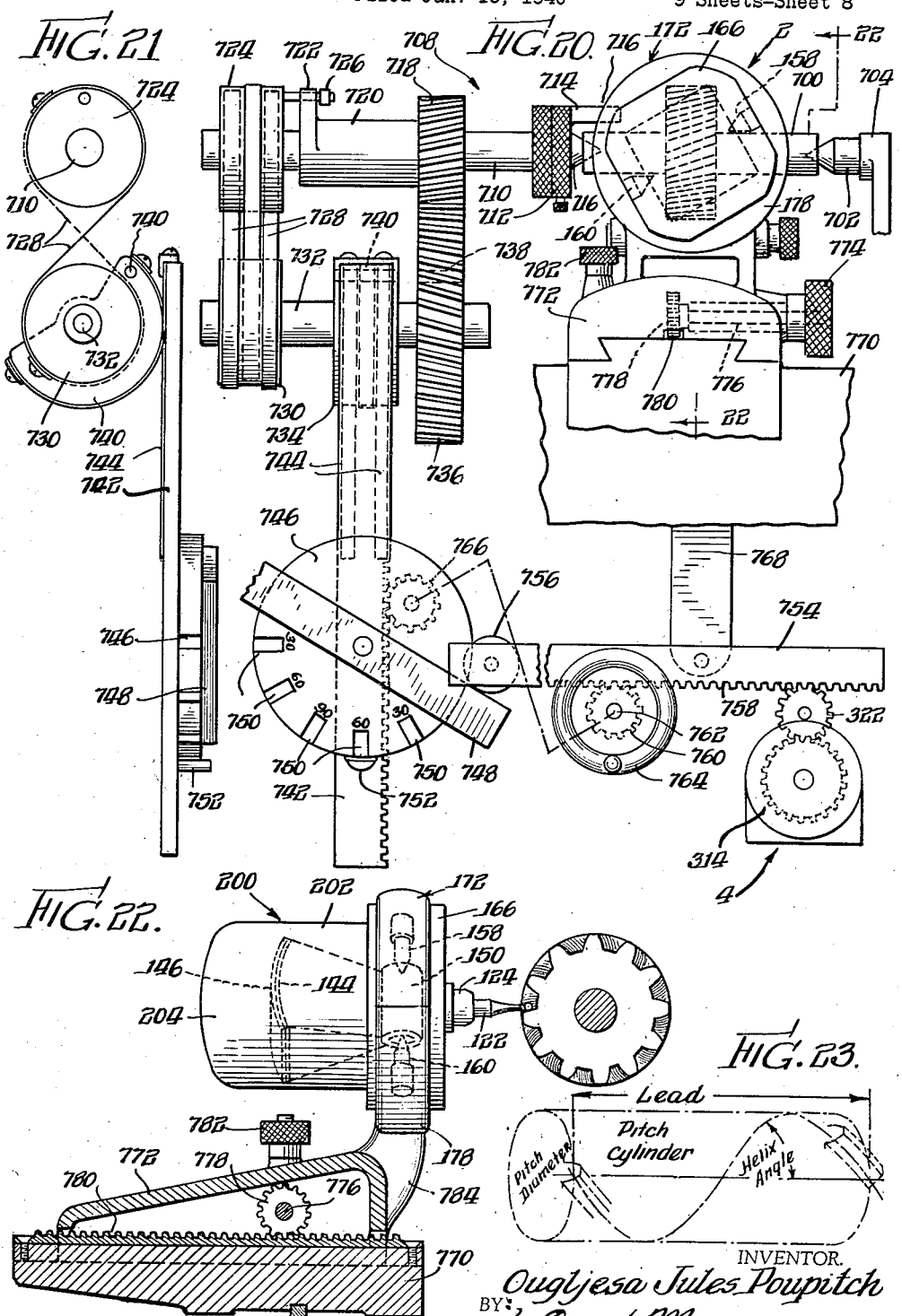
INVENTOR.
Ougljesa Jules Poupitch
BY Cox & Moore
ATTORNEYS.

Oct. 28, 1941.   O. J. POUPITCH   2,261,093
SURFACE TESTING AND RECORDING MACHINE
Filed Jan. 15, 1940   9 Sheets-Sheet 9
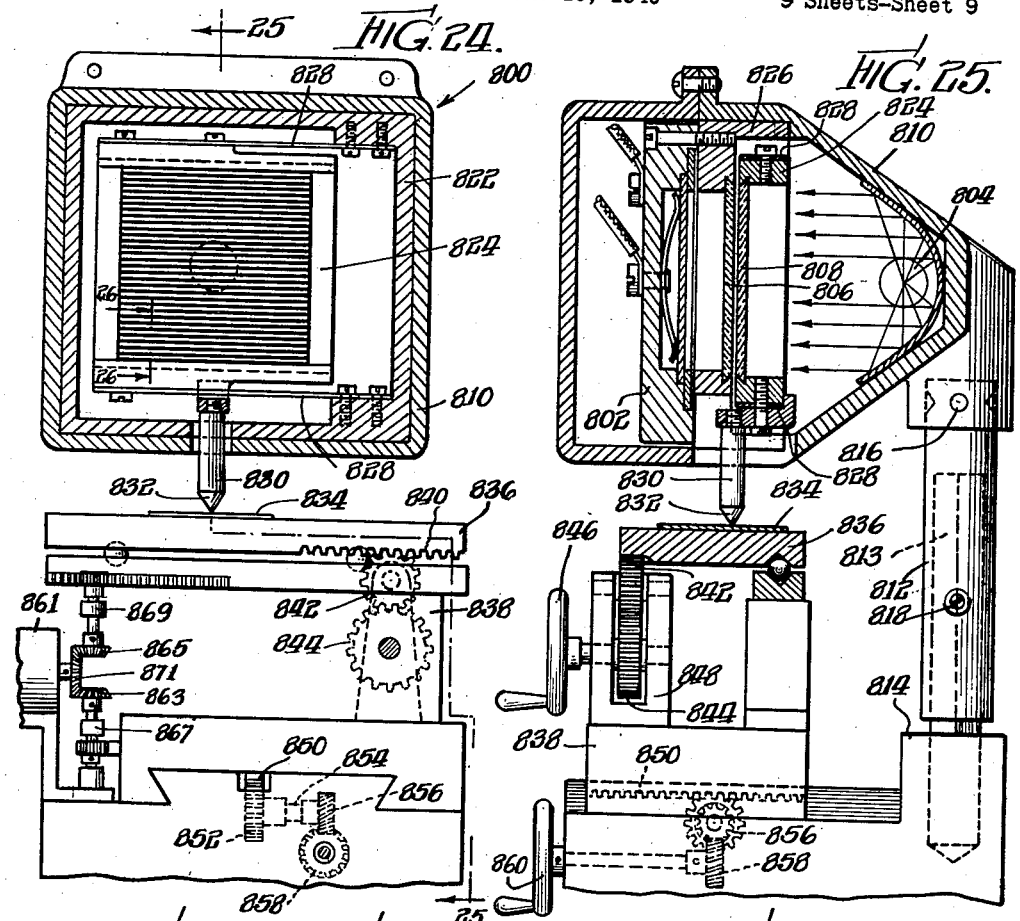
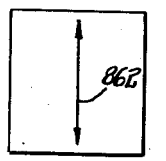 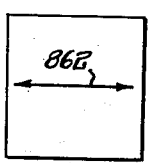 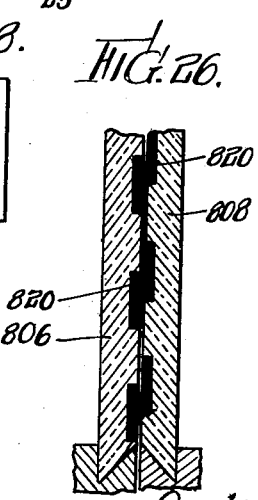 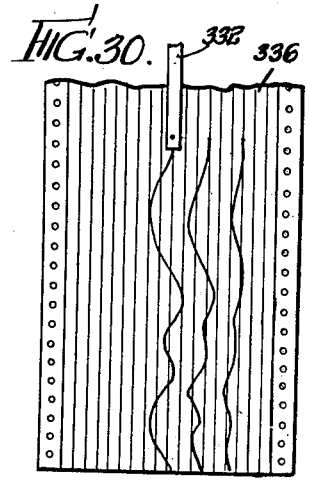
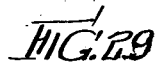
INVENTOR.
Ougljesa Jules Poupitch
BY Cox & Moore
ATTORNEYS.

Patented Oct. 28, 1941

2,261,093

UNITED STATES PATENT OFFICE 2,261,093

SURFACE TESTING AND RECORDING MACHINE

Ougljesa J. Poupitch, Chicago, Ill., assignor to Illinois Tool Works, Chicago, Ill., a corporation of Illinois Application January 15, 1940, Serial No. 313,888

27 Claims. (Cl. 33—174)

This invention relates to a surface tester and recorder. It is an object of this invention to provide a compact, inexpensive, efficient and highly sensitive surface tester and universal recorder providing means by which the data taken may be recorded at a point remote from the testing machine.

Another object of the invention is to provide a universal recorder and attachments for standard testing machines such as machines for testing gear surfaces or tooth profiles by which a single recorder may be used with any number of standard testing machines equipped with these attachments.

A further object of the invention is to provide in a tester and recorder of the above stated character means for electrically controlling the feeder movement of a record sheet so that the record sheet is moved in synchronism with a testing instrumentality and wherein means are provided for controlling the direction of movement of the record sheet so that the record sheet may be moved in one direction even though the direction of movement or action of the testing instrumentality be reversed.

Applicant's invention further contemplates the provision of recorder control attachments which may be used with a large number of standard surface testing machines differing radically in construction.

A further object of the invention is to provide an electro-optical testing instrumentality responsive to deviations in the surface of an object from a desired shape in combination with electrical means responsive to a relative movement between the object and the testing instrumentality for operating a record sheet in synchronism with such relative movement, the record sheet being marked or inscribed by means controlled by the testing instrumentality.

A more specific object of the invention is to provide an electro-optical surface testing instrumentality capable of universal adjustment to test surfaces of any desired configuration.

Other objects and advantages will be apparent from the following description when taken in connection with the accompanying drawings wherein:

Fig. 1 is a view in perspective of an involute testing machine and recorder and is illustrative of one embodiment of the invention;

Fig. 2 is a fragmentary view in elevation illustrating the control panel of the recorder;

Fig. 3 is a view in vertical section taken substantially along the line 3—3 of Fig. 1;

Fig. 4 is a fragmentary vertical section taken along the line 4—4 of Fig. 1;

Fig. 5 is a horizontal section taken along the line 5—5 of Fig. 4;

Fig. 6 is an enlarged fragmentary horizontal section taken along the line 6—6 of Fig. 4;

Fig. 6—A is a view similar to Fig. 6, but with the parts in a different position of adjustment;

Fig. 7 is a fragmentary vertical section taken along the line 7—7 of Fig. 4;

Fig. 8 is a fragmentary vertical section taken along the line 8—8 of Fig. 4;

Fig. 9 is a perspective view of an adjusting cam forming part of the testing instrument;

Fig. 10 is a fragmentary horizontal section taken along the line 10—10 of Fig. 8;

Fig. 11 is a fragmentary view in vertical section taken along the line 11—11 of Fig. 4;

Fig. 12 is a fragmentary view in vertical section taken along the line 12—12 of Fig. 4;

Fig. 13 is a view similar to Fig. 12, but showing the parts in a different operative position;

Fig. 14 is a view in horizontal section taken substantially along the line 14—14 of Fig. 16;

Fig. 15 is a fragmentary view in vertical section taken along the line 15—15 of Fig. 1;

Fig. 16 is a view in vertical section taken substantially along the line 16—16 in Fig. 15;

Figs. 17, 18 and 19 are schematic drawings of electrical control circuits embodied in the invention;

Fig. 20 is a schematic drawing of a helical lead measuring machine equipped with the recorder control attachments forming part of the invention;

Fig. 21 is a view in vertical elevation taken from the left side of the machine shown in Fig. 20;

Fig. 22 is a fragmentary view in vertical section taken substantially along the line 22—22 of Fig. 20;

Fig. 23 is a diagrammatic illustration of a helical gear to aid in understanding of the operation of the machine shown in Figs. 20 to 22;

Fig. 24 is a schematic drawing of a machine for measuring the flatness of surfaces and including a modified form of one of the recorder control attachments in vertical section;

Fig. 25 is a vertical section taken substantially along the line 25—25 of Fig. 24;

Fig. 26 is a fragmentary enlarged vertical section taken substantially along the line 26—26 of Fig. 24;

Figs. 27 to 29 are diagrammatic views illustrating different ways in which the flatness of a surface may be tested by the machine of Figs. 24 to 26;

Fig. 30 is an illustrative view of a record sheet provided by the recorder of the invention.

Referring now to the drawings more in detail, it will be seen that the invention includes an electro-optical surface measuring or testing instrumentality 2 (Figs. 1 and 2 to 13), a position responsive control means 4 (Figs. 3 and 17), and a paper feed drive unit 6 (Figs. 1 and 14 to 16) for an electric recorder 8, and an electric control unit 10, including connections for maintaining the position responsive means and the paper feed drive unit in synchronism. The electro optical testing instrumentality 2 and the position responsive means 4 are formed as attachments of universal application to standard surface testing machines such as machines for testing gears.

In Figs. 1 to 10 the invention is shown as associated with a standard involute measuring or testing machine 12 which comprises a suitable base 14. Mounted upon the upper portion of the base 14 is a slide frame 16 slidable upon horizontal ways or tracks 18 provided along the upper edge of the base 14. The frame 16 is formed with a depending section 20 (Fig. 3) in which is journalled a sleeve 22, the sleeve 22 being retained by frictionless bearings 24. A sleeve 26 is journalled in the bearings 24 and the sleeve 22. The sleeve 26 is provided at its upper end with an enlarged portion retaining the upper bearing 24 in position.

The sleeve 26 receives the tapered shank 30 of a spindle 32, which spindle is provided with an annular flange 34 that forms a support for a cylindrical member, ring or disk 36 which is of an external diameter equal to the diameter of the base circle of a gear 38 to be tested. The disk 36 constitutes in effect a base cylinder for the gear to be tested and is detachably mounted on the spindle 32 so that it may be readily replaced by a similar disk of different size corresponding to a different size gear to be tested. The spindle 32 is threaded as at 40 adjacent its upper end to receive a clamping nut 42 by which the disk is retained in position on the supporting flange 34.

The spindle 32 terminates at its upper end in a conical work supporting center 44 which receives the lower end of the gear or work supporting spindle 47. The upper end of the spindle 46 is received by the center 48 (Fig. 1) which is carried by a tail stock 50, which tail stock includes a housing 52 for the spindle that supports the center 48 and a pair of diverging arms which terminate in sleeves 54. These sleeves 54 are slidable upon vertical posts or columns 56 and are adjustable vertically of the columns by a hand wheel 58 which controls a gear having meshing engagement with the rack teeth 60 (Fig. 3) formed on one or both of the columns 56. The center 48 is adjustable with the spindle and relative to the housing 52 in a similar manner by means of a hand wheel 62. The columns 56 are carried by the slide frame 16.

The base disk or cylinder 36 is coupled to the gear 38 to be tested by a lever 64 which is detachably clamped to the spindle 32 and the arm of the sleeve is slotted as at 66 to receive a post or rod 68 that is clamped to the lever for adjustment along the slot 66. The post 68 supports for vertical adjustment relative thereto a pin or rod 70 which is clamped on the post 68 by a set screw 72 carried by the supporting yoke for the pin 70. The pin 70 projects between the adjacent teeth of the gear 36 to be tested as shown in Fig. 1.

The base disk or cylinder retaining nut 42 when clamping the disk on the spindle 32 also couples the spindle and cylinder for simultaneous rotation and hence the rotation of the base disk is imparted to the gear to be tested through the nut 42, the spindle 32, the lever 64, the post 68 and the pin 70.

The testing instrumentality 2 is supported upon a frame 74 which is slidably mounted upon the front end of the base 14. The frame 74 is provided with a depending portion 76 to which is secured at its lower end a roller bearing 78 that rolls along the flat surface of a plate or bar 80 secured to the base 14. A similar roller bearing 82 is secured to the upper portion of the frame 74 and this bearing rolls along the forward surface of a bar 84 secured to the upper edge of the base 14. The frame 74 is additionally formed with a rearwardly extending portion or section 86 overlying the bar 84 and extending downwardly behind the same. In its downward extension the section 86 carries a bar 88 in horizontal alignment with the bar 84 and between this bar 88 and the bar 84 are interposed a plurality of anti-friction ball bearings 90.

A bar 92 is secured to the section 86 of the frame 74 and is provided with a friction surface to engage the peripheral surface of the base disc or cylinder 36 so that when the bar 92 is moved horizontally with the frame 74 rotation is imparted to the base disc or cylinder 36. The frame 74 is moved horizontally by means of a hand wheel 94 (Fig. 1) which controls a system of gears (not shown), the end gear of which meshes with the rack teeth 96 (Fig. 3) provided along the underside of the stationary bar 84.

An auxiliary frame 98 is mounted on the frame 74 and is slidable in ways formed on the downward extension 76 of the frame 74. Vertical adjustment of the auxiliary frame 98 is accomplished by the hand wheel 100 that controls the rotation of a gear 102 (Fig. 3) which in turn meshes with a rack (not shown) secured to the extension 76 of the frame 74. The testing instrumentality 2 is mounted upon this auxiliary frame or slide 98 as will subsequently be described.

In order to make a test, the slide frame 16 is first adjusted relative to the main base 14 and to the frame 74 to receive a disk or cylinder 36 of an external diameter equal to the base surface of the gear that is to be tested. This adjustment is accomplished by a feed screw 104 (Fig. 3) supported on the main base 14 and operated by a hand wheel 106, the feed screw engaging the threaded block 108 secured to the slide frame 16. The base disk or cylinder 36 of the appropriate size having been mounted on and clamped to the spindle 32, the slide frame 16 is adjusted to bring the disk into engagement with the frictionally effective driving bar 92.

A roller bearing 110, carried by the slide bar 112 mounted on the slide frame 16, is urged by the spring 114 into engagement with the base disk or cylinder 36 at a point diametrically opposite to the point of engagement of the bar 100 with said disk. A gear or other work piece 38 having an involute tooth is mounted between the centers 44 and 48 and the two portions of the frame 74 are adjusted horizontally and vertically to position a testing instrumentality in proper position with respect to the involute surface to be tested or inspected.

An indicator finger 116 (Fig. 1) is formed with furcated arms 118 (Fig. 3) which frictionally clamp in a peripheral recess in the upper portion of the sleeve 26. The frictional clamping of the indicator finger to the sleeve is sufficient to hold the finger securely against inadvertent movement and for indexing of the work, but is sufficiently impositive to permit the finger to be shifted for purposes of manual adjustment. A suitable arcuate graduated scale 120 (Fig. 1) is secured to the slide frame 16 and cooperates with the finger to indicate the angular movement of the gear or work-piece during a testing operation. Before a test is started the finger or pointer 116 is moved to zero position, as indicated in Fig. 1. The gear may be indexed from tooth to tooth while the frame 98 is raised by hand, by manipulation of the finger 116 or any other suitable indexing means automatically and successively presenting the teeth to the testing instrumentality.

The testing instrumentality or device 2 is mounted upon the auxiliary frame or vertical slide 98. This instrumentality comprises a contactor 122 (Figs. 4 and 5) adjustably mounted in a block or tube 124 and retained in adjusted position therein by a set screw 126. The contactor 122 is adapted to engage the surface to be tested, viz., the involute tooth surfaces of the gear 38 at the point of intersection of the base circle with the toothed surfaces and is adapted to control the deflection of a shiftable ray-controlling member or means 128. This ray-controlling member or means 128 comprises a lamp receiving housing 130 formed by oppositely inclined top and bottom walls 132 and 134, a forward wall 136 formed integrally with a mounting boss 138, and rearwardly diverging side walls 140 and 142. The lamp receiving housing 130 is open at its rear end and this end is arcuate in cross-section (as seen in Fig. 5), the side and bottom walls forming at this end of the housing a frame to receive an arcuate grid, grating screen, or the like 144. The screen 144 preferably comprises a sector of plate glass etched on its outer or convex surface with lines .001 of an inch in width spaced .001 of an inch apart. The screen, grid or grating 144 cooperates with a similar arcuate screen, grid or grating 146 mounted in a frame 148, the screen 146 being preferably formed with a sector of plate glass etched on its inner or concave surface with lines of the same width and spacing as the lines on the screen 144.

The mounting boss 138 for the ray-controlling member or means 132 is apertured to receive a pivot pin or stud 150 and to receive the block or tube 124. The block or tube 124 is secured to the boss and the block to the stud as by a screw or screws 152. An adjusting screw 154 is inserted into the inner end of the contactor 122 and engages the stud 150 or an inner wall surface of the block 124 to determine the radial distance between the axis of the stud and the forward free edge or point of the contactor. A clamping nut 156 retains the adjusting screw 154 in adjusted position.

The stud 150 is mounted between adjustable centers 158 and 160. The centers 158 and 160 are preferably formed as integral parts of set screws 162 and 164 received in threaded, diametrically opposed, radial openings in a mounting ring 166 (Figs. 4, 5 and 11). Set screws 168 and 170 at right angles to the set screws 162 and 164 retain these set screws 162 and 164 in adjusted positions.

The mounting ring 166 is supported for radial adjustment in a split clamping ring 172 (Fig. 11) received in an annular groove or recess 174 (Figs. 4 and 5) formed in the periphery of the mounting ring 166. The upper part 176 of the split clamping ring 172 is releasably secured to the lower part 178 of the clamping ring as by means of screws 180. The upper part 176 of the clamping ring 172 is provided with a radial opening 182 to permit a tool to be inserted therethrough to adjust the center 158.

The lower part 178 of the clamping ring 172 is formed integrally with or secured to the horizontal arm 184 of a bracket secured to or formed integrally with the auxiliary frame or slide 98. The lower part of the clamping ring at its point of juncture with, or its connection to, the arm 184 is formed to provide an apertured boss 186 receiving a pair of aligned sleeves 188 and 190, in turn receiving the shank 192 of an adjusting screw 194. The sleeves 188 and 190 are slidably mounted in the boss 186 for relative movement toward and from each other, the sleeves at their inner ends having surfaces 196 which are longitudinally curved concentric to the axis of the ring 166, as shown in Figure 11, but in transverse section are flat, as shown in Figure 4, so as to engage the bottom surface of the groove 174 in the ring 166, thereby to prevent rotation of the sleeves in the boss 186, and to clamp the ring 166 against rotary movement. The shank 192 of the adjusting pin 194 is threaded at its outer end, and mates with the internal threads of the sleeve 188, so that upon rotation of the adjusting screw this sleeve may be moved toward and from the ring 166. The head 194 of the adjusting screw engages the sleeve 190. Hence, upon rotation of the adjusting screw in one direction the sleeves 188 and 190 are moved toward each other and into clamping engagement with the ring 166, but upon rotation in the opposite direction are loosened from this ring. Upon loosening of the clamping sleeves, the mounting ring may be rotatably adjusted relatively to the clamping ring 172, so that the contactor 122 may move along different inclined paths as the auxiliary frame or slide 98 is moved vertically, whereby surfaces inclined at different angles to the rectilinear path of vertical movement of the slide 98 may be traversed by the contactor 122. It should be here noted that the common center of the arcuate screens 144 and 146 lies upon a prolongation of the axis of the contactor 122, and that the axis of the contactor is coincident with the axis of the ring 166. Hence, it will be seen that in every angular position of adjustment of the ring 166, the contactor 122 and the ray-controlling member 128 will be positioned for deflection along lines extending laterally of the coincident axis of the contactor and the ring 166, and at right angles to the surface being traversed.

Preferably the arcuate screens 144 and 146 are concentric to the axis of the pivot stud 150, so that as contactor 122 is deflected in response to the deviations of a tooth surface of the gear 38 from the true involute curve, the screens will cooperate to vary the amount of light passed therethrough in strict proportionality to the movement of the contactor.

The screen 144 is preferably mounted in the frame formed by the rear end of the lamp housing 130 by a dove-tail fit therein, and is preferably resiliently held by a spring catch, or the like, 198, secured to a side wall of the lamp housing and passing through an opening in the frame-defining portion of the housing into engagement with an edge of the screen 144. Accordingly, any loosening in the fit of the screen 144 is compensated by the spring 198.

A housing 200 is provided for enclosing the ray-controlling member or means 128. This housing is preferably formed in two parts, to-wit: a forward part 202, and a rear part or cover 204, detachably secured to the forward part as by screws 206 carried by the rear part and received in the inwardly projecting threaded lugs 208 formed in the forward part 202. The screws 206 pass through larger openings 210 in the vertical side bars of the screen supporting frame 148 and through enlarged openings in the inwardly projecting lugs 212 of the forward part 202.

The frame 148 for the screen 146 is adjustably secured to the forward part 202 of the housing 200, as best shown in Figure 10. As illustrated in this figure, each side bar of the frame 148 is received between the spaced lugs 208 and 212, and each of these side bars carry adjacent its upper and lower ends a pin 214, having a ground, preferably convex, forward face projecting forwardly from the frame bar and engaging the rear face or faces of the lug or lugs 208. The rear faces of these lugs may be ground, if desired, so that in cooperation with the pins 214 the frame may be precisely positioned in a plane at right angles to the axis of the contactor 122. Set screws 216, carried by the lugs 212, engage the side bars of the frame 148 relatively adjacent the corners thereof to maintain the frame 148 and the screen 146 in adjusted position, in proper spaced relation to the screen 144. Set screws 218, carried by opposite walls of the forward part of the housing 200 engage opposite edges of the side bars of the frame 148 relatively adjacent to the four corners of the frame, and provide means for, in effect, angularly adjusting the frame and screen 146 precisely to position the lines of the screen 146 parallel to the lines of the screen 144. Clamping nuts 220 maintain the set screws 218 in adjusted position.

The walls of the forward part 202 of the housing 200 are inwardly offset as at 222 (see Figures 4 and 5), and an opposite pair of these offset wall portions are apertured to receive shouldered bushings 224 and 226 by which the housing is journalled on the centering pins 158 and 160. A spring washer 228, interposed between the bushing 224 and the inner surface of the ring 166, resiliently prevents movement of the housing axially of the centering pins.

A lamp, or ray source 230, is mounted upon the top wall of the housing 200, and extends into the lamp housing 130 through an enlarged opening in the top wall 132 of this lamp housing. The lamp 230 is received within a socket 232, which preferably comprises an insulating cylinder holding an internally threaded metal socket (see Fig. 7), and having opposite contact pieces 234 adapted to engage terminal pins 236 carried by a ring 238 of insulating material secured to the top walls of the housing about an opening therein, through which opening the socket and lamp may be inserted into the housing 200 and the lamp positioned in the lamp housing 130. The top walls of the housing 130 and 200 are provided with aligned openings closed by transparent members or windows 240 and 242, which may be marked or etched with suitable indicia serving to indicate the relative positions of the screens 144 and 146. These transparent windows also provide means by which the operability of the lamp may be determined before any test is initiated.

An electro-optical cell 244 (Figs. 4 and 5) is mounted within the housing 200, and is secured in any convenient manner to the frame 148 for the screen 146, or to the rear part of cover 204 of the housing in position immediately behind the screen 146. The electro-optical, or photoelectric cell 244, is preferably of a self-generating type, similar in principle to the type now widely used as photometers by amateur photographers. These devices being well-known, no detailed description thereof is deemed necessary; but it suffices to note that the electric current generated by such devices vary in strict proportionality with the amount of illumination or quantum of rays to which they are subjected.

The wall 134 of the lamp housing 130 is formed with a rearwardly extending apertured lug 246 (Figs. 4 and 8) underlying the screens 144 and 146. The aperture in the lug is threaded to receive a pin 248 supporting a spherical element or knuckle 250, the knuckle 250 engaging the plunger 252 (Fig. 8) of a dial indicator 254 (Figs. 1 and 8). The dial indicator 254 is mounted upon an arm 256, which swivels upon the axis of a stud 258 to which the arm is secured. The stud 258 is journalled in the arm 184 carried by the auxiliary frame 98. The dial indicator may therefore be moved from the position shown in Figures 1, 5 and 8 to a position on the opposite side of the knuckle 250 when the contactor is positioned to engage and traverse the tooth surface or profile opposite the tooth surface or profile with which it is shown to be in engagement in Figure 5. When traversing the surfaces A (Fig. 5) of the gear teeth, the contactor 122 is deflected to the left, or in the direction of the arrow B in Figure 5, by a "positive condition" of a tooth surface, i. e. in the direction of the arrow B when the engaged point on the tooth surface lies outside the involute curve. The contactor is deflected in the opposite direction by a "negative condition" of a tooth surface, i. e. when the engaged point on the surface A lies inside the true involute curve. The deflection of the contactor in the direction of the arrow B allows the plunger of the indicator (which is spring pressed) to move outwardly, or upwardly as seen in Figure 5; while a movement of the contactor in the opposite direction causes the indicator plunger to move inwardly, or downwardly as seen in Figure 5. When the contactor engages a surface C of gear 2, the contactor is deflected to the right, or in the direction of the arrow D in Figure 5, when the engaged point on the tooth lies outside the true involute curve, and the contactor deflects in the opposite direction when the engaged point on surface C lies inside the true involute curve. The plunger 252 of the indicator, if the indicator were left in the position shown in Figures 1, 5, and 8, would move outwardly under a "negative condition" of a tooth surface C, and inwardly upon a "positive condition" of a tooth surface C. Hence, the needle of the indicator, which moves in the direction determined by the plunger, would give a false indication as to the condition of a tooth surface C. By reversing the dial indicator relative to the knuckle 250, the plunger will move outwardly upon a "positive condition" of a tooth surface C, and will move inwardly upon a "negative condition" of such tooth surface. Hence, whenever the needle of the indicator moves on one side of a reference point on its cooperating scale it will indicate a "positive condition" of a tooth surface, and when it moves on the opposite side of this reference point it will indicate a "negative condition" of a tooth surface.

In order that the contactor 122 may be maintained in engagement with the surface being tested, it is necessary that means be provided for resiliently urging the contactor in a direction opposite to the direction of deflection of the contactor under a "positive condition" of the tooth surface being traversed. This means comprises a sleeve 260 (Figs. 4, 5, 12, and 13) journalled on the block or tube 124, and having oppositely disposed laterally projecting ears or lugs 262, to which are pivoted pins 264 and 266. The pins 264 and 266 are received at their outer ends in diametrically disposed openings 268, in opposite wall portions 222 of the forward part 202 of the housing 220. The openings 268 are defined by outwardly diverging wall surfaces permitting sliding and swinging of the pins in the openings. Coil springs 270 and 272, embracing the pins 264 and 266 respectively, are interposed between opposed wall portions 222 and the ears or lugs 262. Angularly spaced pins 274 and 276, projecting forwardly from the boss 138, are adapted to engage a radially projecting pin 278 carried by the sleeve 260 to limit the angular movement of the sleeve relative to the block or tube 124. The sleeve 260 projects through the forward wall of the housing 200 (see Figs. 4 and 5) and forwardly of the housing carries a laterally projecting pin 280 by which the sleeve may be adjusted angularly relative to the block 124. When the sleeve 260 is in the adjusted position shown in Figure 12 the spring 270 is compressed, while spring 272 is substantially uncompressed, hence the spring 270 exerts a force tending to move the contactor to the right, or in the direction of the arrow D in Figure 5 and into engagement with a tooth surface A. When by manipulation of the pin 280 the sleeve is adjusted angularly to the position shown in Figure 13 the spring 272 is compressed, and the spring 270 substantially uncompressed, hence spring 272 now exerts a force tending to move the contactor to the left, or in the direction of the arrow B in Figure 5 and into engagement with a tooth surface C.

Means are provided for micro-metrically adjusting the housing 200 and hence the screen 146 relative to the screen 144. This means comprises a rod 282 extending through opposed walls of the housing 200 and journalled in sleeves 284 and 286, secured in opposed bosses 288 formed in the housing. The sleeve 284 is secured against rotation by a screw 290, which also provides a means for clamping the rod in adjusted positions. The sleeve 286 is secured against rotation by a set screw 292. Adjusting knobs 294 are pinned to opposite ends of the rod 282, so that regardless of the angular position which the housing 200 may occupy, due to the angular adjustment of the mounting ring 166, one of these knobs will be available for manipulation. The rod 282 carries a radial pin 296 received in an arcuate slot 298 of limited extent and formed in the sleeve 284, whereby to provide means for limiting the permissible angular adjustment of the rod 282. A collar 300 is pinned to the rod 282 and is provided with a beveled cam face 302, engaging a pin 304, carried by a lug or ear 306, projecting rearwardly from the mounting ring 166. A collar 308, loose on the rod 282, engages the pin on the side opposite the collar 300, and a coil spring 310 embraces the rod 282 and is interposed between the collar 308 and a washer 312, which bears against the adjacent boss 288. The clamping screw 290 being released from the rod 282, the rod may be angularly adjusted to rotate the cam collar 300, which as it moves from the position shown in Figure 7 allows the spring 310 to expand, thereby shifting the housing to the left in said figure, whereby to adjust the screen 146 relative to the screen 144, and the spring in moving the housing, also moves the rod 282 and the cam collar to the left, whereby to maintain the cam collar in engagement with the pin 304. When the rod 282 is angularly adjusted in a direction to cause a higher point of the cam surface 302 to engage the pin 304, the cam collar and rod will be moved to the right, as seen in Figure 7, hence the housing will be shifted to the right.

The housing 200 is mounted for adjustment on the centering pins 158 and 160, as previously described (see Fig. 4), and hence as one or the other of the knobs 294 is manipulated the housing swings on these centering pins. Since the screens 144 and 146 have a common center coincident with the axis of the stud 150 and the centering pins, this angular adjustment of the housing 200 effects the angular adjustment of the screen 146 parallel to the screen 144.

The screen 146 is by this means adjusted relative to the screen 144 to one of two zero positions in which the etched, and therefore light opaque lines, of the screens are relatively disposed as diagrammatically shown in Figures 6 and 6A. When the point of the contactor 122 is first brought into engagement with a tooth surface A, the screens are adjusted to one of these zero positions, as for example to the position shown in Figure 6, so that deflection of the contactor in the direction of the arrow B, due to a "positive condition" of the tooth surface, will cause a decrease in the amount of illumination or quantum of rays passing through the screens, whereas deflection of the contactor in the opposite direction, due to a "negative condition" of the tooth surface will cause an increase in the amount of illumination or quantum of rays passing through the screens. When the contactor is first brought into engagement with an opposite tooth surface, such as the tooth surface C, the screens are adjusted to the other zero position, as for example the position shown in Figure 6—A. Hence, when the contactor 122 is deflected in the direction of the arrow D, due to a "positive condition" of the tooth surface C, the amount of illumination or quantum of rays passing through the screens will again be decreased, whereas when the contactor moves in the opposite direction, due to a "negative condition" of the tooth surface C, the amount of illumination or quantum of rays passing through the screens will be again increased. Therefore, regardless of whether the tooth surface A or the tooth surface C is being traversed, a "positive condition" of the tooth surface will cause a decrease in the amount of light passing through the screens, while a "negative condition" of the tooth surface will cause an increase in the amount of light passing through the screens. It will be evident, however, that the tooth surface A may be traversed with the screens in the initial position shown in Figure 6—A, while the tooth surface C may be traversed with the screens in the zero position shown in Figure 6, it being merely necessary that in whichever position the screens reside initially when one tooth surface is to be traversed, it must be adjusted to the opposite position when the opposite tooth surface is to be traversed.

It will be further evident that the screens need not be in one of the particular zero positions shown when initiating a testing operation of a tooth surface, but that they may be in any relative position which allows sufficient relative movement between the screens so that the same condition of a tooth surface will not cause first a decrease in light, and then an increase as the condition becomes more accentuated.

The "position responsive control" means 4 may comprise any well-known "position transmitting motor" or generator 314, having a synchronizing winding or device and a pair of oppositely active main or reversing windings. The "motor" 314 (see Fig. 3) is secured to a bracket 316 in turn secured to a bracket 318 that is fastened as by screws 320 to the bottom of the depending section 20 of the slide 16. A gear 322 is secured to the sleeve 26 for rotation therewith, as by means of an internally threaded hub portion received on the external threads of the sleeve 26 and an externally threaded bolt or pin received by the internal threads of the sleeve. The gear 322 meshes with the gear 324 secured to a stud shaft 326 held in the bracket 318. The stud 326 carries a second gear 328 that meshes with a gear 330 on the shaft of the "motor" 314.

A horizontal movement of the slide or frame 74 causes a like movement of the attached friction bar 92, which determines the extent of angular rotation of the base cylinder or disk 36 and the gear 38 that is to be tested. Accordingly, the rotor of the "position transmitting motor" 314 is rotated in strict proportionality to the horizonal movement of the testing instrumentality and in strict proportionality to the rotation of the gear 38. In other words, the rotor of the transmitter "motor" is moved in strict proportionality to the relative movement between the testing instrumentality and the surface to be tested.

The electric recorder unit 8 may be of any well-known conventional structure embodying an amplifier, the signal input terminals of which are connected to the photo-electric cell, and the output terminals of which are connected to a conventional meter having a recording scriber or pen 332 (Figs. 15 and 16). Preferably the recorder unit 8 is a "Pilotel recorder" marketed by a well-known manufacturer of electrical instruments. Further detailed description of this recording unit is therefore deemed unnecessary.

The paper feed drive unit 6 comprises a shaft 334 for receiving a roll 336 of recording paper. The roll is held on the shaft by a nut 338, which may be removed from the shaft to replace the exhausted roll by a new roll. For this purpose one side wall of the housing 340 for the paper feed drive unit is provided with a door 342, which may be held in position in the housing as by a plurality of latches 344 (Figs. 14 and 15). Upon removal of the door 342 and the nut 338 the old roll may be removed from the shaft and a new roll substituted therefor. The roll is driven in a rewinding direction by a disk 346, having a portion 348 mating with the drive hub of the paper roll. The disk 346 is driven by a ratchet 350 through a pawl 352 pivotally secured as by pin 354 to the outer face of the disk 346. The ratchet 350 is secured to and driven by a pulley 356. Pulley 356 is driven through a belt formed by a continuous coil spring 358 passing about this pulley and about a pulley 360 secured to a shaft 362.

Paper is fed from the roll by a drum 364 secured to the shaft 362 and provided adjacent its opposite edges with annular series of pins 366, providing sprocket teeth 368 received in the lines of edge perforations in the recording paper. An arcuate guide 370 may extend over a portion of the circumference of the drum 364 in spaced relation thereto to prevent the paper from jumping off the sprocket teeth. From the feeding roll or sprocket 364 the paper passes over a plate or anvil 372 secured to the side walls of the housing 340 and extending forwardly of the front wall 374 of the housing, thereby facilitating the feeding of the paper in the inward direction, or for rewinding on the roll.

The shaft 362 is driven by a gear 376 which meshes with a gear 378 on a stud 380, secured to a side wall of the housing 340. The gear 378 also meshes with and is driven by a gear 382 on the shaft of a "receiving motor" 384. This motor is similar to the "position transmitting motor" 314, and is similarly provided with a synchronizing winding or device, and a pair of oppositely acting main or reversing windings. Through the connections of the electric control unit 10, subsequently described, the rotor of the motor 384 is driven in synchronism with the rotor of the "motor" 314.

The gear 376 is journalled on the shaft 362, and is interposed between a shoulder 386 formed on the shaft, and a collar 388, which bears against the inner race of a ball bearing 390 mounted in a fixed portion of the adjacent side wall of the housing 340. The gear 376, the shaft 362, the collar 388, and the inner race of the ball bearing 390 are releasably forced into binding engagement by a knob 392 threaded on the outer end of the shaft, so that rotation of the gear 376 causes rotation of the shaft first in one direction and then in the other as the rotor of the motor 384 rotates first in one direction and then in the other. The knob 392 is held against inadvertent movement off the end of the shaft by a cap screw 394 threaded into the end of the shaft. Upon rotation of the knob 392 in a releasing direction the gear 376 is released from binding engagement with the shoulder 386 of the shaft 362, and hence the knob 392 constitutes, in effect, a manually operable element of a clutch connection between the gear and the shaft.

When the gear 376 is released from binding engagement with the shaft, it may nevertheless drive the shaft in a direction to feed the paper forwardly, i. e. off the roll. This is accomplished by means of a ratchet 396 secured to the hub of the gear 376 and engaging a pawl 398 pivotally secured as by a pin 400 to the face of a disk 402 keyed to the shaft 362. When the gear 376 is driven in a clockwise direction, as seen in Fig. 15, the teeth of the ratchet engage the pawl, and through the pawl and disk drive the shaft in a clockwise direction to feed the paper forwardly. However, when the gear rotates in the counter-clockwise direction, the ratchet merely idles by the pawl, and hence the shaft is not driven in this counter-clockwise direction when the gear is released from binding engagement with the shoulder 386 of the shaft. It should be here noted that the teeth of the ratchet 396 extend oppositely relative to the teeth of the ratchet 350, for the ratchet 350 must drive the paper roll in a direction opposite to the direction which the ratchet 396 drives the feed roll 364.

When the feed roll is driven in the clockwise direction, as seen in Fig. 15, to feed the paper forwardly from a roll of large diameter, the roll and the pawl 352 will be driven at an angular speed less than the speed of the ratchet 350, hence the ratchet will idle by the pawl. However, when the roll becomes of relatively small diameter, the feed roll will cause the paper roll to be driven at an angular speed which is greater than the speed of the ratchet, and hence the pawl 352 will drive the ratchet, but the belt formed by continuous coil spring 358 will yield and allow one or the other of the pulleys 356 and 360 to slip relative to this drive belt. When the feed roll and the paper roll shaft 334 are driven in a counter-clockwise direction to feed the paper backwardly, or rewind it on the roll, this continuous coil spring drive belt will again yield to permit slippage of the pulley relative to the drive belt when the feed roll becomes of such relatively large diameter that it would in the absence of such slippage of the drive belt cause the paper to break.

Knobs 404 and 406 may be pinned to outwardly projecting ends of the shafts 362 and 334 respectively to provide manually operable means by which the shafts may be operated to feed the paper forwardly or backwardly.

The housing 340 for the paper feed drive unit includes a cover 408 preferably pivotally secured as at 410 to the housing 412 for the recording unit 8, the cover having a transparent window 414, through which operation of the scriber 332 may be observed. Means are provided for raising the recording scriber or pen 332 when the cover is raised, and to lower the scriber or pen when the cover is closed. This means comprises a cam 416 secured to a side flange of the cover and adapted to engage a collar 418 carried by one of the legs of the pen-lifting lever or wire 420 which forms a part of the electric meter of the recorder unit, the pen of the standard meter being in two sections pivoted to each other as at 422 to permit such raising and lowering of the recording scriber or pen. A spring 424 is secured at one end to a fixed point 426 and at its other end engages one of the legs of the pen-lifting lever 420, so as to normally urge this lever in an upward direction (as seen in Fig. 15), whereby to raise the recording scriber. The cam 416 in engaging the collar 418 maintains the pen-lifting lever in its lower portion, and the pen against the recording paper on the anvil 372. Accordingly, when the cover or hood is raised to permit threading of the paper over the roll 364 and the anvil 372, the pen is in raised position to prevent damage thereto and to the paper. The arcuate guide 370 for the paper may be secured to the cover 408 and be raised therewith to facilitate placing the paper on the sprocket teeth of the roll 364. The recorder unit 8, the paper feed drive unit 6, and the control unit 10 may be mounted upon a common portable standard or base 428, (Fig. 1) so that the entire recording device may be shifted from testing machine to testing machine as may be desired.

The control unit 10 may be mounted in the lower part of the housing 340 for the paper feed drive unit, or it may be mounted in a separate housing 430, as shown in Fig. 1, the walls of the housing 430 being preferably flush with the walls of the housing 340, and supporting the latter upon the standard 428. The forward wall of housing 430 is provided with a control panel 432 containing plug-receiving sockets 434 and 436, a reversing switch 438 and manually operable knobs 440 and 442, the knob 440 manipulating a control resistor, and the knob 442 manipulating a control switch. The socket 434 is adapted to detachably receive a plug 444 attached to a 5-conductor cable 446, connected at its other end to the "position transmitting motor" 314 of the "position responsive control means" 4. The plug 444 is of standard construction, having six contacts, but one of these contacts is not used. The socket 436 receives a plug 448 attached to a 4-conductor cable 450, connected at its other end to the testing instrumentality 2.

The connections for the control unit 10 are schematically shown in Fig. 17. As shown in this figure, the wires 452 and 454 from the synchronizing winding of the "position receiving motor" 384 are connected to the terminals 456 and 458 of a terminal strip 460 secured to the rear face of the panel 432. The main or "forward" motor winding connected internally to the terminals M—1 and M—2 of the motor 384 is connected by the wires 462 and 464 to the terminals 466 and 468 of the terminal strip 460, the other main or "reversing" winding of the motor 384, which is connected internally to motor terminals M—2 and M—3, is connected by the wire 464 and the wire 470 to the terminals 468 and 472, respectively. The switch 438 comprises, as best shown in Fig. 19, a pair of multiple blade switches 474 and 476 manually operated by a common lever 478. The terminal 466 from the terminal M—1 of motor 384 is connected by a wire 480 and the wire 482 to the movable contact blade 484 and the fixed contact blade 486. The terminal 472 from the terminal M—3 of motor 384 is connected by the wires 488 and 490 to the movable contact blade 492 and to the fixed blade 494. The terminal 468, connected to the common terminal M—2 of motor 384, is connected by the wire 496 and the wire 498 to the movable blade 500 and to the fixed blade 502. The movable blade 504 is connected by the wire 506 to the contact 508 of the socket 434. The movable blade 510 is connected by the wire 512 to the contact 514 of the socket 434. The fixed blade 516 is connected to the wire 506 and thereby to the socket contact 508. The fixed blade 518 is connected to the wire 512 and thereby to the socket contact 514. The fixed blade 520 is connected to the movable blade 522 and by the wire 524 to the socket contact 526. The fixed blades 528 and 530 are inter-connected, and connected by the wire 532 to the socket contact 534. The movable blades 536 and 538 are inter-connected, and connected by the wire 540 to the terminal of a twist lock, plug-and-socket 542, to which terminal the line L—2 of the supply cord 544 is connected. The other terminal of the twist lock, plug-and-socket which is connected to the line L—1 of the supply cord is connected by the wire 546 to the socket contact 548. The socket contacts 534 and 548 are additionally connected by the wires 550 and 552 to the terminals 456 and 458 that are connected to the motor terminals T—1 and T—2 for the synchronizing thereof.

Input power terminals 554 and 556 for the amplifier of the recorder are connected by the wires 558 to the terminals of the twist lock, plug-and-socket 542. Signal input terminals 560 and 562 of the amplifier of the recorder are connected by the wires 564 and 566 respectively to the contacts 568 and 570 of the socket 436. The contact 572 of the socket 436 is connected by the wire 574 to one tap 576 of an 8-volt supply source forming part of the recorder, the other tap 578 of this 8-volt supply source being connected by the wire 580 to the wiper arm 582 of an adjustable control resistor 584 operated by the knob 440. One end of the resistor 584 is connected by the wire 586 to one contact of a control switch 588 operated by the knob 442. The other contact of this switch 588 is connected by the wire 590 to the socket contact 592.

When the plug 444 is inserted in the socket 434, the contacts 534 and 548 of the socket 434 are connected by the wires 594 and 596 of the cable 446 to the terminals T—1 and T—2 for the synchronizing winding of the "position transmitting motor", or generator 314 of the "position responsive control means" 4. The contact 514 of socket 434 is connected by the wire 598 of the cable 446 to the terminal M—3 of the generator 314, which is internally connected to one end of a main or "reversing" winding of this generator, the other end of this reversing winding being internally connected to the terminal M—2, and the terminal M—2 being connected by the wire 600 of the cable 446 to the contact 526 of socket 434. The contact 508 of the same socket is connected by the wire 602 of the cable 446 to the terminal M—1 of the generator 314, this terminal being connected to one end of the other main or "forward" winding which at its other end is connected to the terminal M—2.

When the plug 448 is inserted in the socket 436, the socket contact 568 is connected by the wire 604 of the cable 450 to one terminal of the photo-electric cell 244. The other terminal of the photo-electric cell is connected by the wire 606 of the cable 450 to the socket contact 570. The contact 572 of socket 436 is connected by the wire 608 of the cable 450 to one terminal of the lamp-receiving socket 232; the other terminal of this lamp-receiving socket being connected by the wire 610 of the cable 450 to the socket contact 592.

It will therefore be apparent that when the plugs 444 and 448 are inserted in the sockets 434 and 436 respectively, and the switch 588 closed, the lamp in the socket 232 is connected to the 8-volt terminals 576 and 578 of the power supply circuit for the amplifier of the recorder by a circuit which extends through the wire 608, the contact 572 of socket 436, the wire 574 to the terminal 576, and from the terminal 578 through the wire 580, the wiper-arm 582, the resistor 584, the wire 586, the switch 588, the wire 590, the socket contact 592, and the wire 610. Thus, the resistor 584 adjustably controls the luminous intensity of the lamp, and determines the sensitivity of the electro-optical testing instrumentality 2, and the consequent sensitivity of the pen 332 of the recorder. Therefore, when the surface being tested is relatively large, so that minute deviations from the true tooth surface may be neglected, the sensitivity of the testing instrumentality and the recorder may be decreased. This also has the advantage, in the case of such relatively large tooth surfaces, of preventing deviations from the true tooth surface from exceeding the range of the recorder or the meter thereof. On the other hand, when relatively small tooth surfaces are being tested, minute deviations from the true tooth surface are of considerable importance, and hence the resistor may be adjusted to increase the sensitivity of the testing instrumentality and the recorder, so that such minute deviations will cause an appreciable proportionate movement of the recording pen.

The position of the pen transversely of the paper may be determined by the adjustment of the resistor 584, the relative adjustment of the screens 144 and 146 or by manipulation of the adjusting means (not shown) forming a part of the standard recorder 8.

The photo-electric cell is connected to the signal input terminals 560 and 562 of the amplifier by a circuit which extends through the wire 604, the contact 568 of socket 436, the wire 564, the terminal 560, and from the terminal 562 through the wire 566, the socket contact 570, and the wire 606.

The synchronizing winding of the generator or "position transmitting motor" 314 is connected to the synchronizing winding of the "position receiving motor" 384 by a circuit which extends through the wire 596, the contact 534 of socket 434, the wire 550, the terminal 458, the wire 454 to the terminal T—1 of the synchronizing winding in the motor 384, and from the terminal T—2 through the wire 452 to terminal 456, the wire 552, the socket contact 548, and the wire 594 to the terminal T—2 for the synchronizing winding in the generator 314. Current is applied to both of these synchronizing windings from the supply leads L—1 and L—2 connected to the socket contacts 534 and 548, as previously described, to which socket contacts both synchronizing windings are connected when the plug 444 is inserted in the socket 434.

The "forward" winding of the generator 314 is connected to the "forward" winding of the motor 384 when the switch 438 is in the "forward" position by a circuit which extends from the terminal M—1 through the wire 602, the socket contact 508, the wire 506, the switch blades 504 and 486, the wire 480, the terminal 466, the wire 462 to the terminal M—1 of motor 384, and from the terminal M—2 of said motor through the wire 464, the terminal 468, the wire 496, the switch blades 500 and 520, the wire 524, the socket contact 526, and the wire 600 to the terminal M—2 of generator 314. The "reversing" winding of the generator is connected to the "reversing" winding of the motor when the switch 438 is in the "forward" position by a circuit which extends from the terminal M—3 of the generator through the wire 598, the socket contact 514, the wire 512, the switch blades 510 and 494, the wire 488, the terminal 472, the wire 470 to the terminal M—3 and from the terminal M—2 of the motor 384 to the terminal M—2 of the generator 314, as previously described.

When the switch 438 is in the "reversing" position, the "forward" winding of the generator is connected to the "reversing" winding of the motor by a circuit which extends from the terminal M—1 of the generator through the wire 602, the socket contact 508, the wire 506, the switch blades 516 and 492, the wire 490, the wire 488, the terminal 472, the wire 470 to the terminal M—3 of the motor 384. The other terminal M—2 of this reversing winding of the motor is connected to the terminal M—2 of the generator by a circuit extending through the wire 464, the terminal 468, the wire 496, the wire 498, the switch blades 502 and 522, the wire 524, the socket contact 526, and the wire 600. The "reversing" winding of the generator is now connected to the "forward" winding of the motor through a circuit which extends from the terminal M—3 of the generator through the wire 598, the socket contact 514, the wire 512, the switch blades 518 and 484, the wire 482, the wire 480, the terminal 466, the wire 462 to the motor terminal M—1 and from the motor terminal M—2 to the generator terminal M—2, as previously described. Thus, it will be seen that when the switch 438 is in one position, the position receiving motor will operate in the same direction as the position transmitting motor, or generator, and will be synchronized therewith; but with the switch 438 is in the opposite position, the position-receiving motor will operate in the opposite direction to the position-transmitting motor or generator, and in synchronism therewith. Accordingly, when the contactor 122 traverses one tooth surface A, the record sheet will be fed outwardly as the slide frame 74 is moved to the right. The record sheet moves inwardly, or in a direction to re-wind the paper on the roll when the slide frame 74 moves to the left to position the testing instrumentality for the testing of the next successive tooth surface. When, however, the contactor 122 traverses a tooth surface C, the switch 438 is moved to the opposite position, and accordingly movement of the slide frame 74 to the left causes an outward movement of the record sheet, while a movement of the slide to the right to re-position the testing instrumentality for testing the next successive tooth surface C causes the record sheet to be moved inwardly, or to re-wind on the roll.

Above the switch 438 the panel 432 is provided with suitable indicia, such as the arrows 612 and 614 for indicating the direction of movement of the switch lever 478 in accordance with the direction of action of the slide frame 74. Thus, when the slide 74 is to be moved to the right to traverse a tooth surface A, the switch lever is moved in the direction of the arrow 614, or to the right; while when the frame is moved to the left to traverse a tooth surface C the switch lever is moved in the direction of the arrow 612, or to the left. Since the record sheet is moved rearwardly when the slide frame moves opposite to its direction of action, a number of record curves may be marked in parallel on the record sheet, thus resulting in a considerable saving in the amount of paper used over a substantial period of time. The position of the pen transversely of the record sheet is determined by the setting of the shiftable screen 144 relative to the screen 146, and therefore, in order to make such utilization of the record sheet by this adjustment, one or the other of the knobs 294 of the testing instrumentality 2 must be adjusted to position the screen 144 to different initial zero positions for successive testing operations.

When the switch lever 478 of the switch 438 is moved to neutral position, the "position transmitting motor" or generator 314 is disconnected from the "position receiving motor" 384, so that the work piece, the testing instrumentality, and the recorder, may be preliminarily adjusted for a test without causing a feeding of the record sheet, or if desired, a test of the surface to be tested may be made by the use of the indicator 254 alone. It may from time to time occur that, for one reason or another, it is not desired nor possible to mark successively produced curves transversely of the record sheet, and therefore it is desired to cause the record sheet to move outwardly when the slide frame 74 is moved in its direction of action, but to prevent inward or reverse feeding of the record sheet when the slide frame is moved in the opposite direction to re-position the testing instrumentality for traversal of another like tooth surface. Hence upon rotation of the manually operable knob 392 (Figs. 14 and 16), the drive gear 376 may be released from binding engagement with the shoulder 386 of the shaft 362; and when thus released the drive gear 376 can effect rotation of the shaft 362 and the paper feed drum or sprocket 364, only in the forward direction through the ratchet 396 and the pawl 398.

Figures 20 to 22 diagrammatically indicate the manner in which the electro-optical or testing instrumentality 2 and the "position responsive control" means 4 may be attached to a helical lead measuring machine of standard construction to determine the correctness of the helices of the helical gear.

The gear, or other work piece, to be tested, having a helical tooth or thread, is carried by a support or shaft 700 mounted between the center 702 of tail stock 704 and the center 706 of head stock 708. The head stock 708 comprises a shaft 710 apertured to receive the center 706, and carrying a rotatably adjustable collar 712, having an axially directed drive finger 714, engageable with a radially projecting drive finger 716 on work support 700. The shaft 710 is driven through a gear 718 secured thereto, the gear being also secured to a sleeve 720 journalled on the shaft and having a radially projecting arm 722. On the outer end of the shaft is loosely mounted a drum 724. The arm 722 and the inner face of the drum 724 are apertured to receive a detachable plug 726 which, when in the position shown in Figure 20, connects the sleeve 720 to the drum 724, so that the drum drives the sleeve and thereby drives the gear 718 and the shaft 710. The drum 724 is driven by steel tapes 728 passing about the drum 724 and a drum 730 secured to a shaft 732. The shaft 732 is driven by a drum 734 secured to the shaft. A gear 736 is loosely mounted on the shaft 732 and meshes with the gear 718, the gear 736 having an opening 738 and the drum having an opening 740 to receive the plug 726 by which the drum 734 may be connected to the gear 736, so that this drum may drive this gear.

The drum 734 is driven by a vertical slide 742 connected to the drum by steel tapes 744. A disk 746 is mounted on a slide 742 for rotary adjustment relative to the slide, and carries a sine bar 748 and blocks 750. The blocks 750 are angularly spaced about the disk at the indicated angles to the longitudinal center line of the sine bar 748 as shown. Suitable angle indications may be inscribed on the disk between the blocks. Means not shown are provided for micrometrically effecting a rotary adjustment of the disk precisely to position the sine bar at the desired angle to the slide 742. The stop pin 752, carried by the slide in juxtaposition to the periphery of the disk 746 and the stop pin may have micrometer readings on both sides of a zero point to prove the set up.

A horizontal slide 754 carries at one end a roller 756 engaging the sine bar 748. The slide 754 is formed on its lower edge, or has secured thereto, a rack 758 engageable with a gear 760 on a shaft 762. The shaft 762 mounts a hand wheel 764, movable axially of the shaft selectively to effect a driving connection with the gear 760, or with the train of gears 766, by which the slide 742 may be directly driven by the hand wheel 764.

The slide 754 is suitably connected, as diagrammatically indicated, by the bar 768 to a horizontally slidable test instrument support or frame 770. The electro-optical surface testing instrumentality 2 is mounted upon a casting 772, mounted on the frame 770 for slide adjustment transverse to the path of the movement of the frame 770 and toward and from the axis of the centers 702 and 706. Adjustment of this support casting 772 is effected by means of a knob 774 secured at the outer end of a shaft 776 journalled in the casting, and carrying at its inner end a gear 778 meshing with a rack 780 secured to the slide frame 770. Locking of the support casting in adjusted position is effected by one or more clamping screws 782.

The lower part 178 of the supporting ring 172 of the testing instrumentality 2 is mounted upon, or formed integrally with an upwardly and forwardly projecting arm 784 of the support casting 772. As shown in Fig. 20, the mounting ring 166 of the testing instrumentality is angularly adjusted to position the common axis of the centers 158 and 160 at the proper helix angle for the gear to be tested, the axis of the contactor 122 intersecting the axis of the gear or work piece; or in other words, intersecting the common axis of the centers 702 and 706 at right angles thereto.

The bracket 318, which supports the "position transmitting motor" or generator 314 of the "position responsive control means" 4, is secured to any convenient part of the frame of the machine, so that the gear 322, which drives this generator 314, meshes with the rack 758 of the slide 754. The testing instrument 2, and the "position responsive control means" 4 are of course provided with the connecting cables 450 and 446, as shown in Figs. 1 and 18, which cables carry the plugs 448 and 444 respectively for connecting the testing instrumentality and the "position responsive control means" to the control unit 10 for the paper feed drive unit 6 and the recorder 8, as previously described.

In effecting a testing operation, the sine bar 748 is first adjusted to the angle required by the lead of a helical tooth or surface being tested. As shown in exaggerated form in Fig. 23, the lead of a helical surface or tooth is the axial distance between corresponding points on the pitch cylinder, through which distance a point must travel axially of the cylinder to generate the helix of the particular helix angle. Therefore, when the sine bar 748 has been adjusted to the proper lead, rotation of the hand wheel 764 causes the testing instrumentality 2 and the work piece to be given a relative proportionate rotation and translation describing the true helical surface for the gear or tooth being tested.

A "positive" or "negative" condition of a tooth surface will cause a deflection of the contactor 122 which, as previously described, will control the movement of a marking pen; the magnitude of movement of the marking pen being in exact proportion to the extent of deflection of the contactor, and the record sheet under the control of the "position responsive means" 4 will be fed past the marking pen in synchronism with the relative movement of translation between the work piece and the testing instrumentality.

If the sine bar 748 is in a more horizontal position, the hand wheel 764 is pulled outwardly so that the slide 754 is driven thereby; but when the sine bar stands in a more vertical position, the hand wheel is pushed inwardly to effect a driving connection to the vertical slide 742. When the slide 754 is the primary mover, the slide 752 is driven thereby through the sine bar 748; but when the slide 742 is the prime mover the sine bar drives the slide 754.

Most helical gears require less than a full revolution to check a tooth surface, and therefore ordinarily the plug 726 is positioned as shown in Fig. 20 to connect gear 718 to the drum 724. However, when worms, or other work requiring many revolutions, are to be checked, the plug 726 is positioned to extend through the openings 738 and 740 of the gear 736 and drum 734 so that the shaft 710 is driven through the step-up gears 736 and 718.

For testing the flatness of a surface, the arrangement shown in Figs. 24 to 26 may be employed. As shown in these figures, an electro-optical testing instrumentality 800 comprises an electro-optical or photoelectric cell 802 and a ray source or lamp 804, between which is interposed a stationary screen, grid or grating 806, and a cooperating shiftable screen, grid or grating 808. The photo-electric cell, the lamp, and the screens, are mounted in housing 810 which in turn is mounted for rotary adjustment on a vertically adjustable sleeve or the like 812 mounted on a rod 813 secured to a base casting or support 814. The housing is held in each angular position of adjustment as by a screw 816, and the sleeve 812 or the like is held in its vertically adjusted position by a screw 818 or the like.

Screens 806 and 808 are preferably of glass, etched or otherwise marked with horizontally extending series of spaced lines 820, preferably of the same width and spacing as in the case of the screens 144 and 146. The stationary screen 806 is mounted in a suitable frame 822, fastened in any convenient manner to the housing 800, the cell 802 being bolted to this frame 822. The shiftable screen 808 is mounted in a frame 824. The frame 822 is provided with a peripheral flange 826 encircling the frame 824. Spring strips 828 above and below the frame 824 are secured to portions of the upper and lower edges of the frame 822 and to upper and lower corners of the flange 826 of the frame 824. The spring strips 828 are calibrated so as to return the screens to the zero position or setting shown in Fig. 26 when an operating force is removed.

Shifting or deflection of the screen 808 is caused by a pin 830 screw-threaded into the lower portion of the frame 824 and having a pointed end 832 for engaging the surface of a work piece 834 to be tested, the pin 830 passing through an opening in the bottom of the housing.

The work piece 834 may be supported by any convenient work holder on a table or slide 836, the slide 836 being rectilinearly shiftable along a path parallel to the plane of the screens. The slide 836 is mounted upon slide frame 838, which is movable along a rectilinear path transverse to the plane of the screens. The table 836 carries a rack 840, with which meshes a gear 842 driven by a gear 844. The gear 844 is operated by a hand wheel 846. Thus the hand wheel 846 causes a rectilinear movement of the slide 836. The gears 842 and 844 and the shaft carrying the gear 844 and the hand wheel 846 are mounted upon a bracket 848 secured to the slide frame 838. The slide 838 also carries a rack bar 850 driven by a gear 852 on a shaft 854, the shaft 854 also carrying a gear 856, meshing with a gear 858, driven by a hand wheel 860. The gears 852, 856, and 858, the shaft 854 and the hand wheel shaft are mounted in any convenient manner upon the base casting or support 814. Thus it will be seen that by manipulation of the hand wheel 860 the slide frame 838 is moved to shift the work piece transversely to the plane of the screens. The position transmitting motor 861 may be connected to the slides 836 and 838 through a suitable summation mechanism including a differential gearing having the driving gears 863 and 865 connected to the slides through double ball clutch couplings or transmissions 867 and 869 insuring rotation of each of the gears 863 and 865 in the same direction independent of the direction of movement of the slides. The differential gear 871 drives the "motor" 861.

It will be apparent that by selective or simultaneous manipulation of the hand wheels 846 and 860, the work piece may be shifted relative to the pin or contactor 830 along any given straight line path, as indicated by the arrows 862 in Figs. 27 to 29, or may be shifted in straight line paths of such small increments as to approach a curved path. Thus it will be seen that the work piece may be tested for the flatness of its surface along a line extending parallel to the screens as indicated in Fig. 27, transversely to the screens, as indicated in Fig. 28, or diagonally, as shown in Fig. 29. To indicate the entire flatness of the surface, it will be best tested by the diagonal traversal of the surface of the work piece. However, where the surface of the work piece is curved in one plane, but flat in another, the flatness of the surface in this other plane may be determined by a longitudinal or transverse traversal of the surface of the work piece as indicated in Fig. 27 or Fig. 28.

Thus it will be seen that applicant has provided a gear testing device and recorder providing means by which the data taken may be recorded at a point remote from the testing machine; means by which a single recorder may be used with any number of standard testing machines equipped with universal recorder attachments; means for electrically controlling the feeder movement of a record sheet so that the record sheet is moved in synchronism with a testing instrumentality; means for controlling the direction of the movement of the record sheet so that the record sheet may be moved in one direction, even though the direction of movement of the testing instrumentality be reversed; recorder attachments which may be used with a large number of standard surface testing machines differing radically in construction; an electro-optical testing instrumentality responsive to deviations in the surface of an object from a desired shape in combination with electrical means responsive to a relative movement between the object and the testing instrumentality for operating a record sheet in synchronism with such relative movement, the record sheet being marked or inscribed by means controlled by the testing instrumentality; and an electro-optical surface testing instrumentality, capable of universal adjustment to test surfaces of any desired configuration.

Changes may be made in the form, construction and arrangement of the parts without departing from the spirit of the invention or sacrificing any of its advantages, and the right is hereby reserved to make all such changes as fairly fall within the scope of the following claims.

I claim:

1. In a surface contour tester and recorder, means for supporting work pieces having surfaces to be tested which may extend in different directions, a testing instrumentality including a member adapted to engage the surfaces to be tested, means for relatively moving the work piece and the testing instrumentality to cause the surface engaging member to traverse said surfaces in a forward direction of action in accordance with the direction of extension of said surfaces and reversely, a recorder having a marking member operatively controlled by said testing instrumentality, means for feeding the record sheet past the marking member in synchronism with the relative movement of the testing instrumentality and the work piece and control means for causing the record sheet to move in the same direction past the marking member during the traversal of the surfaces in a forward direction of action and to move reversely past the marking member as the testing instrumentality traverses the surfaces in a direction opposite to the direction of action.

2. In a surface tester and recorder, means for supporting a work piece the surface of which is to be tested, a testing instrumentality including a member adapted to engage the surface to be tested, means for relatively moving the work piece and the testing instrumentality to cause the surface engaging member to traverse said surface, a recorder having a marking member operatively controlled by said testing instrumentality and means for feeding a record sheet past said marking member, said feeding means comprising a synchronous drive motor, and a synchronous generator actuated by said moving means and connected to said drive motor to synchronize the movement of the record sheet with the relative movement of the testing instrumentality and the work piece.

3. In a surface tester and recorder, means for supporting a work piece the surface of which is to be tested, a testing instrumentality including a member adapted to engage the surface to be tested, means for relatively moving the work piece and the testing instrumentality to cause the surface engaging member to traverse said surface, a recorder having a marking member operatively controlled by said testing instrumentality and means for feeding a record sheet past said marking member, an electric transmitter actuated by said moving means, an electric receiver synchronized with the transmitter for driving the sheet feeding means to synchronize the movement of the record sheet with the relative movement of the testing instrumentality and the work piece.

4. In a surface tester and recorder, means for supporting a work piece the surface of which is to be tested, a testing instrumentality including a member adapted to engage the surface to be tested, means for relatively moving the work piece and the testing instrumentality forwardly and backwardly to cause the surface engaging member to traverse said surface, a recorder having a marking member operatively controlled by said testing instrumentality and means for feeding a record sheet past said marking member, synchronous driving means operatively controlled by said moving means and operatively connected to said sheet feeding means for feeding the record sheet forwardly and backwardly in synchronism with the forward and backward relative movement of the testing instrumentality and the work piece.

5. In a surface tester and recorder, means for supporting a work piece the surface of which is to be tested, a testing instrumentality including a member adapted to engage the surface to be tested, means for relatively moving the work piece and the testing instrumentality forwardly and backwardly to cause the surface engaging member to traverse said surface, means for indexing the work piece and the testing instrumentality relatively between forward movements to cause the surface engaging member to traverse different portions of said surface, a recorder having a marking member operatively controlled by said testing instrumentality and means for feeding a record sheet past said marking member, synchronous driving means operatively controlled by said moving means and operatively connected to said sheet feeding means for feeding the record sheet forwardly and backwardly in synchronism with the forward and backward relative movement of the testing instrumentality and the work piece, and means operable upon indexing of the testing instrumentality and the work piece relatively for repositioning the marking member transversely of the record sheet whereby successively tested portions of the surface produce transversely spaced curves upon the record sheet.

6. In a surface tester and recorder, means for supporting a work piece the surface of which is to be tested, a testing instrumentality including a member adapted to engage the surface to be tested, means for relatively moving the work piece and the testing instrumentality forwardly and backwardly to cause the surface engaging member to traverse said surface, means for indexing the work piece and the testing instrumentality relatively between forward movements to cause the surface engaging member to traverse different portions of said surface, a recorder having a marking member operatively controlled by said testing instrumentality and means for feeding a record sheet past said marking member, synchronous driving means operatively controlled by said moving means and operatively connected to said sheet feeding means for feeding the record sheet in synchronism with the relative movement of the work piece and the testing instrumentality, and means for automatically disconnecting the sheet feeding means from said driving means upon backward relative movement of the work piece and the testing instrumentality.

7. In a surface tester and recorder, means for supporting a work piece the surface of which is to be tested, a testing instrumentality adapted to engage the surface to be tested, means for relatively moving the work piece and the testing instrumentality forwardly and backwardly to cause the surface engaging member to traverse said surface, a recorder having a marking member operatively controlled by said testing instrumentality, means adapted to receive a roll of recording paper, synchronous driving means operatively controlled by said moving means for feeding the recording paper from said roll and rewinding it on said roll in synchronism with the relative movement of said testing instrumentality and said work piece as said testing instrumentality and work piece are relatively moved forwardly and backwardly, said driving means including a driven roll for feeding the paper from the paper roll, means for driving said roll receiving means to rewind the paper on the roll and slip connections preventing over-drive of the feed roll and the paper roll receiving means as the diameter of the paper roll varies.

8. Recorder control attachments for connecting a surface testing machine having relatively movable testing and work supporting members to a recorder having a marking member and means for feeding the record sheet past a marking member, said attachments including a testing instrumentality having relatively deflectable members, means for connecting one of said deflectable members to said testing member, means responsive to the relative deflection of said relatively deflectable members and operatively connected to the marking member of the recorder for controlling said marking member, a synchronous position responsive generator, means for actuating said position responsive generator in synchronism with the relative movements of the testing member and the work piece, and a synchronous motor connected to said position responsive generator and driving the sheet feeding means of the recorder to synchronize the movements of the record sheet with the relative movements of the testing member and the work piece.

9. In a gear tooth tester and recorder, means for supporting a gear, the tooth surfaces of which are to be tested, a testing instrumentality including a member adapted to engage the tooth surfaces to be tested, means for simultaneously rotating the gear supporting member and rectilinearly moving the testing instrumentality to cause the surface engaging member to traverse the surface of a tooth being tested and be deflected upon deviation of the tooth surface from the true tooth shape, a recorder having a marking member and means for feeding a record sheet past said marking member, means responsive to the deflection of the surface engaging member and operatively connected to said marking member for controlling said marking member, synchronous position transmitting and receiving motors, means connecting said position transmitting motor to said gear supporting member for rotation therewith, and means operatively connecting said position receiving motor to said sheet feeding means to cause said sheet to be fed in synchronism with the rotation of said gear supporting member.

10. In a surface tester, means for supporting a work piece the surface of which is to be tested, an electrical indicator adapted to indicate deviations of the surface from the desired shape, a testing instrumentality including a support, means for relatively moving said support and said work piece, a ray source, ray sensitive means operatively connected to said indicator, a housing for said ray source and said ray sensitive means, ray-controlling members in said housing and interposed between said ray source and said ray sensitive means, one of said ray-controlling members being secured to the housing against movement relative thereto, means for shiftably supporting the other of said ray-controlling members on said housing, a surface engaging contactor operatively connected to said shiftably supported ray-controlling member for shifting said shiftable ray-controlling member in a given direction relative to the other of said ray-controlling members, and means for adjustably mounting said housing on said support to permit said surface engaging contactor to traverse surfaces inclined at various angles relative to the path of relative movement of the support and the work piece while shifting the shiftable ray-controlling member in the same direction relative to the other ray-controlling member.

11. In a surface tester, a shiftable support, a surface engaging contactor, a ray source, a ray sensitive means, an electrical indicator controlled by said ray sensitive means a pair of parallel ray-controlling screens between said source and said ray sensitive means, mounting means to which said ray sensitive means and one of said screens are secured against movement relative thereto, means for shiftably supporting the other of said screens for movement parallel to the first screen, means operatively connecting said shiftably supported screen to said contactor for movement thereby, and angularly adjustable means for supporting said mounting means, said shiftably supported screen and said contactor on said shiftable support for simultaneous angular adjustment to permit said contactor to traverse surfaces inclined at different angles to the path of movement of the shiftable support while shifting said shiftably supported screen parallel to the first screen.

12. In a surface tester, a shiftable support, a surface engaging contactor, a ray source, a ray sensitive means, an electrical indicator controlled by said ray sensitive means, a pair of parallel ray-controlling screens between said source and said ray sensitive means, mounting means to which said ray sensitive means and one of said screens are secured against movement relative thereto means for shiftably supporting the other of said screens for movement parallel to the first screen, means operatively connecting said shiftably supported screen to said contactor for movement thereby, angularly adjustable means for supporting said mounting means, said shiftably supported screen and said contactor on said shiftable support for simultaneous angular adjustment to permit said contactor to traverse surfaces inclined at different angles to the path of movement of the shiftable support while shifting said shiftably supported screen parallel to the first screen, and means for adjusting said first screen relative to the shiftably supported screen in every angular position to which said angularly adjustable support may be adjusted.

13. In a surface tester, a contactor adapted to traverse the surface to be tested, swingable mounting means for said contactor, a ray source, a ray sensitive means, an electrical indicator for indicating the shape of the surface tested by giving an indication proportional to the deflection of the contactor, connections between said indicator and said ray sensitive means, a pair of arcuate ray-controlling screens concentric to the axis of swing of said contactor and a common mounting means for said contactor, said screens, said ray sensitive means and said source, means supporting said mounting means for angular adjustment about the longitudinal axis of the contactor whereby said contactor may traverse surfaces inclined at different angles.

14. In a surface tester, a contactor adapted to traverse a surface to be tested, a ray source, ray sensitive means, an electrical indicator remote from said ray sensitive means and connected thereto, a pair of ray-controlling screens interposed between said ray source and said ray sensitive means, a housing for said ray source, said ray sensitive means and said screens, said housing having an opening in one wall thereof through which said contactor extends, means for pivotally mounting said contactor within and relative to said housing, said screens being of curvilinear configuration concentric to the pivot axis of said contactor, means connecting one of said screens to said contactor for pivotal movement therewith upon deflection of the contactor by the surface tested, a support, and means for mounting said contactor mounting means and said housing on said support for angularly adjusting said contactor, said ray source, said screens and said ray sensitive means whereby said contactor may traverse surfaces of different inclination while swinging the connected screen upon deflection by the surface tested.

15. In a surface tester, a contactor adapted to traverse a surface to be tested, a ray source, ray sensitive means, an electrical indicator remote from said ray sensitive means and connected thereto, a pair of ray-controlling screens interposed between said ray source and said ray sensitive means, a housing for said ray source, said ray sensitive means and said screens, said housing having an opening in one wall thereof through which said contactor extends, means for pivotally mounting said contactor within and relative to said housing, said screens being of curvilinear configuration concentric to the pivot axis of said contactor, means connecting one of said screens to said contactor for pivotal movement therewith upon deflection of the contactor by the surface tested, a support, means for mounting said contactor mounting means and said housing on said support for angularly adjusting said contactor, said ray source, said screens and said ray sensitive means whereby said contactor may traverse surfaces of different inclination while swinging the connected screen upon deflection by the surface tested, and means for clamping said mounting means in each adjusted position on said support.

16. In a surface tester for testing a work piece having opposed surfaces to be tested, a surface engaging contactor, a ray source, a ray sensitive means, an electrical indicator connected to and controlled by said ray sensitive means, a pair of ray-controlling screens between said ray source and said ray sensitive means, a pivotal mounting means for said contactor, said screens being of curvilinear configuration concentric to the pivot axis of said contactor mounting means, means connecting said contactor to one of said screens for swinging said one screen relative to the other screen upon deflection of the contactor by the surface being tested and adjustable mechanism including resilient means operatively connected to the contactor to apply a force to the contactor in one direction when it is engaged with one of the opposed surfaces to be tested and in the opposite direction when the contactor is in engagement with the other of the opposed surfaces to maintain the contactor in engagement with one or the other of said opposed surfaces.

17. In a helical lead tooth tester and recorder, means for supporting a work piece having a helical tooth surface the lead of which is to be tested, an electro-optical testing instrumentality including a contactor adapted to engage the helical surface to be tested, a ray source, a ray sensitive means, relatively shiftable ray-controlling members interposed between said source and said ray sensitive means and operatively connected to said contactor for relative movement thereby in a direction normal to the helical surface, means for relatively rotating and rectilinearly moving said work support and said testing instrumentality proportionally to cause the contactor to traverse the helical surface to be tested and be deflected in a direction normal to the helical surface upon deviation of said surface from the true lead, a recorder having a marking member operatively controlled by said ray sensitive means and means for feeding a record sheet past said marking means, and synchronous driving means operatively connected to said moving means and to said sheet feeding means for feeding the sheet in synchronism with the proportionate relative rotation and rectilinear movement of the work piece and the testing instrumentality.

18. In a helical lead tester and recorder, means for supporting a work piece having a helical surface, the lead of which is to be tested, a testing instrumentality including a contactor adapted to engage the helical surface, a ray source, a ray sensitive means, ray-controlling means operatively connected to said contactor for control thereby, a rectilinearly shiftable support, means for mounting said contactor, said ray-controlling means, said ray source and said ray sensitive means for simultaneous angular adjustment relative to said rectilinear support to position the contactor for the traversal of surfaces of differing helix angle, means for proportionally rotating said work piece and shifting said rectilinear support according to the true lead of the helical surface to be tested, a recorder having a marking member operatively controlled by said ray sensitive means and means for feeding a record sheet past said marking member, and means operatively connected to said means for proportionally rotating said work support and rectilinearly shifting said support for controlling the feeding of said sheet feeding means to synchronize the feeding of the sheet with the movement of the work support and the testing instrumentality.

19. In a tester and recorder for determining the flatness of a surface, means for supporting the object having a surface to be tested, a testing instrumentality having a member adapted to engage said surface, means for relatively moving the object and the testing instrumentality selectively along a path in one direction or a path in another direction or a path which is a resultant of the simultaneous relative movement along both paths, a recorder having an operating member controlled by said instrumentality and means for feeding a record sheet past said marking member and means for connecting said moving means to said sheet feeding means for controlling the feeding of said sheet in proportion to the relative movement of the work piece and the testing instrumentality along either path individually or along the resultant path determined by simultaneous relative movement along the two paths.

20. In a tester and recorder for determining the flatness of a surface, means for supporting the object having a surface to be tested, a testing instrumentality having a member adapted to engage said surface, means for relatively moving the object and the testing instrumentality selectively along a path in one direction or a path in another direction or a path which is a resultant of the simultaneous relative movement along both paths, a recorder having an operating member controlled by said instrumentality and means for feeding a record sheet past said marking member, and synchronous driving means operatively connected to said moving means and to said sheet feeding means for controlling the feeding of the sheet in synchronism with the relative movement of the work piece and the testing instrumentality along one or the other paths or in synchronism with the relative movement resultant from the simultaneous movement of said work piece and said testing instrumentality along both paths.

21. In a tester and recorder for determining the flatness of a surface, means for supporting an object having a surface to be tested, an electro-optical testing instrumentality including a ray source, a ray sensitive means, a pair of flat screens interposed between said source and said ray sensitive means, means for shiftably mounting one of said screens for rectilinear movement relative to the other, a surface engaging contactor carried by said shiftable screen, means for resiliently maintaining said contactor in engagement with the surface, means for relatively moving the testing instrumentality and the object to cause the contactor to traverse the surface and be deflected thereby upon deviation of the surface from true flatness, and an indicator operatively controlled by said ray sensitive means.

22. In a tester and recorder for determining the flatness of a surface, means for supporting an object having a surface to be tested, an electro-optical testing instrumentality including a ray source, a ray sensitive means, a pair of flat screens interposed between said source and said ray sensitive means, means for shiftably mounting one of said screens for rectilinear movement relative to the other, a surface engaging contactor carried by said shiftable screen, means for resiliently maintaining said contactor in engagement with the surface, means for relatively moving the testing instrumentality and the object to cause the contactor to traverse the surface and be deflected thereby upon deviation of the surface from true flatness, and a recorder having a marking member operatively controlled by said testing instrumentality.

23. A tooth tester and recorder including means for supporting a work piece having opposed tooth surfaces to be tested, an electro-optical testing instrumentality including a contactor adapted to engage the surfaces to be tested, a ray source, ray-sensitive means, relatively shiftable ray-controlling members interposed between said ray source and said ray-sensitive means to vary the magnitude of the ray energy passing to said ray-sensitive means, means for selectively rotating said work supporting means in a clockwise or counterclockwise direction and simultaneously moving said testing instrumentality along a rectilinear path in a forward or backward direction to cause the contactor to traverse one or the other of the opposed tooth surfaces and be deflected in opposite directions upon corresponding conditions of deviations of the proposed tooth surfaces from the true involute curve, means connecting said contactor to one of said ray-controlling members to cause relative shifting of said members in opposite directions upon deflection of said contactor in opposite directions, means for causing said members to vary the ray energy passing to said source in the same direction of increasing or decreasing magnitude upon corresponding conditions of opposed tooth surfaces, a recorder having a marking member operatively controlled by said ray-sensitive means, means for feeding a record sheet past said marking member, and means operating the sheet feeding means in proportion to the movements of the work piece and testing instrumentality.

24. An instrument for measuring distances comprising a gauging element, a ray source, a ray-sensitive means adapted to operate an electrical indicator, a pair of parallel ray-controlling screens between said source and said ray-sensitive means, a support, a ring mounted on said support for angular adjustment about the axis of the ring, a housing pivotally mounted on said ring for angular adjustment about an axis transverse to the axis of the ring, said ray-sensitive means and one of said screens being mounted in said housing relatively remote from said axis of adjustment, a second housing pivotally mounted in the first housing for swinging movement about an axis coincident with the axis of adjustment of the first-mentioned housing, means mounting said gauging element on said second housing to project it from both housings along the axis of said ring, the other of said screens forming a wall of the second housing in juxtaposition to said one screen, the second housing having an opening through one wall thereof inwardly of said other screen, and means mounting said ray source on the first housing to project through the opening in the second housing.

25. An instrument for measuring distances comprising a gauging element, a ray source, a ray-sensitive means adapted to operate an electrical indicator, a pair of parallel ray-controlling screens between said source and said ray-sensitive means, a support, a ring mounted on said support for angular adjustment about the axis of the ring, a housing pivotally mounted on said ring for angular adjustment about an axis transverse to the axis of the ring, said ray-sensitive means and one of said screens being mounted in said housing relatively remote from said axis of adjustment, a second housing pivotally mounted in the first housing for swinging movement about an axis coincident with the axis of adjustment of the first-mentioned housing, means mounting said gauging element on said second housing to project it from both housings along the axis of said ring, the other of said screens forming a wall of the second housing in juxtaposition to said one screen, the second housing having an opening through one wall thereof inwardly of said other screen, means mounting said ray source on the first housing to project through the opening in the second housing, and means for angularly adjusting said ring relative to said support about the coincident axis of said ring and said gauging element.

26. An instrument for measuring distances comprising a gauging element, a ray source, a ray-sensitive means adapted to operate an electrical indicator, a pair of parallel ray-controlling screens between said source and said ray-sensitive means, a support, a ring mounted on said support for angular adjustment about the axis of the ring, a housing pivotally mounted on said ring for angular adjustment about an axis transverse to the axis of the ring, said ray-sensitive means and one of said screens being mounted in said housing relatively remote from said axis of adjustment, a second housing pivotally mounted in the first housing for swinging movement about an axis coincident with the axis of adjustment of the first-mentioned housing, means mounting said gauging element on said second housing to project it from both housings along the axis of said ring, the other of said screens forming a wall of the second housing in juxtaposition to said one screen, the second housing having an opening through one wall thereof inwardly of said other screen, means mounting said ray source on the first housing to project through the opening in the second housing, and means for adjusting the first housing angularly about the coincident axis of pivotal movement of both housings to adjust said one screen relative to the other screen.

27. An instrument for measuring distances comprising a gauging element, a ray source, a ray-sensitive means adapted to operate an electrical indicator, a pair of parallel ray-controlling screens between said source and said ray-sensitive means, a support, a ring mounted on said support for angular adjustment about the axis of the ring, a housing pivotally mounted on said ring for angular adjustment about an axis transverse to the axis of the ring, said ray-sensitive means and one of said screens being mounted in said housing relatively remote from said axis of adjustment, a second housing pivotally mounted in the first housing for swinging movement about an axis coincident with the axis of adjustment of the first-mentioned housing, means mounting said gauging element on said second housing to project it from both housings along the axis of said ring, the other of said screens forming a wall of the second housing in juxtaposition to said one screen, the second housing having an opening through one wall thereof inwardly of said other screen, means mounting said ray source on the first housing to project through the opening in the second housing, means for angularly adjusting said ring relative to said support about the coincident axis of said ring and said gauging element, and means for adjusting the first housing angularly about the coincident axis of pivotal movement of both housings to adjust said one screen relative to the other screen.

OUGLJESA J. POUPITCH.

CERTIFICATE OF CORRECTION.

Patent No. 2,261,093.  October 28, 1941.

OUGLJESA J. POUPITCH.

It is hereby certified that error appears in the printed specification of the above numbered patent requiring correction as follows: Page 2, first column, line 8, for "2 to 13" read --3 to 13--; page 9, first column, line 7, for "with" read --when--; and that the said Letters Patent should be read with this correction therein that the same may conform to the record of the case in the Patent Office.

Signed and sealed this 6th day of January, A. D. 1942.

(Seal)

Henry Van Arsdale,
Acting Commissioner of Patents.